US012276726B1

(12) United States Patent
Abdeldayem et al.

(10) Patent No.: US 12,276,726 B1
(45) Date of Patent: Apr. 15, 2025

(54) RADAR MULTIPATH DETECTION BASED ON CHANGING VIRTUAL ARRAYS

(71) Applicant: Zoox, Inc., Foster City, CA (US)

(72) Inventors: Omar Abdeldayem, San Mateo, CA (US); Badeea Ferdaous Alferdaous Alazem, Redwood City, CA (US); Samantha Marie Ting, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 366 days.

(21) Appl. No.: 17/900,829

(22) Filed: Aug. 31, 2022

(51) Int. Cl.
*G01S 13/931* (2020.01)
*G01S 13/00* (2006.01)
*G01S 13/87* (2006.01)

(52) U.S. Cl.
CPC .......... *G01S 13/931* (2013.01); *G01S 13/878* (2013.01); *G01S 13/003* (2013.01)

(58) Field of Classification Search
CPC ...... G01S 13/931; G01S 13/89; G01S 13/089; G01S 13/46; G01S 13/046; G01S 2013/462; G01S 2013/0245; G01S 2013/0254
USPC .......................................................... 342/70
See application file for complete search history.

(56) References Cited

U.S. PATENT DOCUMENTS 9,201,132 B2 * 12/2015 Hsu ........................ G01S 7/4814
9,401,541 B2 * 7/2016 Conwell .................. H01Q 3/24
9,885,774 B2 * 2/2018 Kumar .................. G01S 5/0264
10,122,409 B2 * 11/2018 Han ....................... H04B 1/7163
10,296,001 B2 * 5/2019 Smith .................... G01S 13/865
12,080,060 B2 * 9/2024 Feng ...................... G01S 13/723
2012/0328037 A1 * 12/2012 Hsu .......................... G01S 7/282
375/267
2013/0265196 A1 * 10/2013 Conwell .................. H01Q 3/24
342/372
2016/0047894 A1 * 2/2016 Rode ..................... G01S 7/4814
342/16
2017/0299691 A1 * 10/2017 Kumar .................. G01S 5/0218
2018/0059231 A1 * 3/2018 Dewberry ............. G01S 13/878
2018/0120842 A1 * 5/2018 Smith ..................... G01S 7/412
2022/0114363 A1 * 4/2022 Feng ...................... G06V 20/00
2022/0173530 A1 * 6/2022 Ueda ....................... H01Q 1/40
2023/0144600 A1 * 5/2023 Jokanovic .............. G01S 7/414
342/70

(Continued)

*Primary Examiner* — Ladimir Magloire
*Assistant Examiner* — Michael W Justice
(74) *Attorney, Agent, or Firm* — Lee & Hayes, P.C.

(57) ABSTRACT

This disclosure describes techniques for detecting multipath radar returns and modifying radar data. A vehicle may use radar devices to receive radar data while traversing within an environment. The vehicle may process the radar data using a virtual array based on an arraignment of the antennae within an aperture of the radar device. Using the virtual array, the vehicle may determine an elevated noise level that may be indicative of a multipath radar return. Based on the elevated noise level, the vehicle may determine a second virtual array associated with multipath radar returns, and may process the radar data using the second virtual array. Based on determining that the noise level associated with the second virtual array is lower than the initial noise level, the vehicle may determine that the radar data includes a multipath radar return, and may modify the radar data to correct or mitigate the error caused by the multipath return.

20 Claims, 8 Drawing Sheets

(56) References Cited

U.S. PATENT DOCUMENTS

2023/0168359 A1* 6/2023 Rezvani ................ G01S 13/003
  342/54
2023/0384418 A1* 11/2023 Jeannin ................ G01S 13/584

* cited by examiner

RADAR MULTIPATH DETECTION BASED ON CHANGING VIRTUAL ARRAYS

BACKGROUND

Sensors, such as radar sensors, generally measure the distance from a radar device to the surface of an object by transmitting a radio wave and receiving a reflection of the radio wave from the surface of the object, which may be read by a sensor of the radar device. The sensor may generate a signal based at least in part on radio waves incident on the sensor. A portion of the signal may include a return signal attributable to the reflection, but additional portions may be attributable to noise and/or other interfering signals (whether from the radar device itself or from an external source). Within the context of autonomous vehicles, radar systems may be used to detect objects in driving environments, analyze the objects, and determine routes for the vehicle to safely and efficiently navigate the environment. For example, an autonomous vehicle may use radar data to detect and avoid obstructions, such as pedestrians, within a planned driving path. However, in some examples, radar noise and interference may cause errors in analysis of radar data, such as false-positive object detections. Such radar data analysis errors can present challenges to safely and comfortably traversing through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
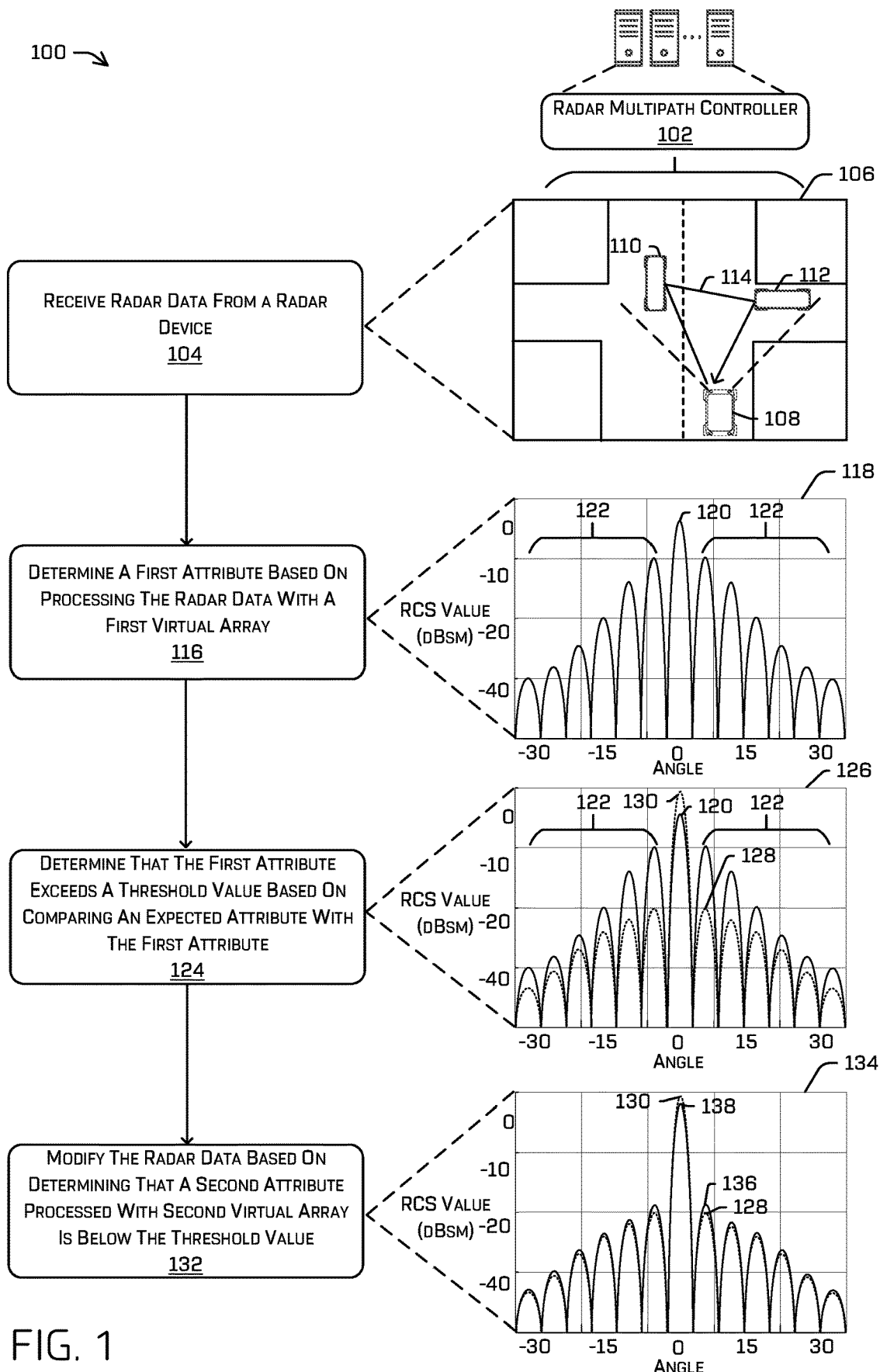
FIG. 1 is a pictorial flow diagram illustrating a process for modifying received radar data using virtual arrays, in accordance with one or more examples of the disclosure.

This disclosure describes techniques for detecting multipath radar returns and modifying radar data. As described herein, various different virtual arrays may be determined and used to process radar data and determine various attributes (e.g., noise levels, phase information, map data, etc.) which may be evaluated to detect multipath radar returns. In some examples, a vehicle may use radar devices to receive radar data while traversing within an environment. The vehicle may process the radar data using a virtual array. In some examples, the virtual array may be based on an arrangement (e.g., spacing, location, etc.) of the physical antennae within an aperture of the radar device. When the vehicle determines an attribute that may be indicative of a multipath radar return, the vehicle may determine a second virtual array associated with multipath radar returns and may re-process the radar data using the second virtual array. Based on processing the radar data using the second virtual array, the vehicle may determine that a second attribute of the radar data is lower than the first attribute. In other examples, the vehicle may determine that the second attribute satisfies a threshold value. In such examples, the vehicle may identify that the radar data may include a multipath radar return, and may modify the radar data accordingly. As discussed throughout this disclosure, the techniques described herein may improve vehicle safety and driving efficiency by reducing radar noise and improving the accuracy of the radar data used by the vehicle, thereby allowing the vehicle to perform more efficient and accurate driving maneuvers.

When an autonomous vehicle is operating within a driving environment, the vehicle may use radar devices to capture radar data of the surrounding environment. The autonomous vehicle may analyze the radar data to detect and classify various objects within the environment, including dynamic objects that are capable of movement (e.g., vehicles, motorcycles, bicycles, pedestrians, animals, etc.) and/or static objects (e.g., buildings, road surface features, trees, signs, barriers, parked vehicles, etc.). In order to safely traverse a driving environment, an autonomous vehicle may include various components configured to detect objects and classify the objects. In some examples, a perception component of the autonomous vehicle may include any number of machine-learning (ML) models and/or components to detect and classify objects in the environment based on radar data and/or other sensor data, evaluate the radar data, and classify the objects, etc. For instance, the perception component may analyze radar data to detect an object near the vehicle, and may evaluate various components of the radar data (e.g., range, azimuth, doppler, elevation, etc.) to segment, classify, and track the object. One or more prediction and/or planning components of the autonomous vehicle may use the output object detection and classification components to determine a driving path for the vehicle relative to the object. Any of the various vehicle-based components described herein may use one or more ML models and/or heuristics-based components to perform the respective sensor data analysis and driving functionality described herein.

In some instances, radar data received from radar devices in an environment may inaccurately detect and/or misidentify objects based on radio waves reflecting off of multiple surfaces in the environment. As an example, vehicles may use radar devices to detect and/or identify objects within the environment. In some cases, radar devices may transmit radio waves which may reflect off a single object within the environment and return to the radar sensor. In such cases, based on analyzing the radar data from the returned radio wave, the vehicle may determine a distance to the object from which the transmitted radio wave reflected, as well as an azimuth of the object, an elevation of the object, etc. However, in other examples, the radio wave transmitted by the radar device may reflect off multiple objects/surfaces within the environment before returning to the radar device. In such cases, the radar data received based on the radio wave may be inaccurate, as radar devices generally assume direct (e.g., non-multi-path returns) and may process a multipath return under the assumption that it is a direct return. When receiving multipath and/or mirrored radar return signals, the radar device may inaccurately detect and/or classify objects within the environment based on the inaccurate radar data.

As an example illustrating a multipath radar return, a radar device may transmit a radio wave which may initially reflect off a first object (e.g., a vehicle, pedestrian, bicycle, etc.) within the environment. After reflecting off of the first object, the same radio wave may subsequently reflect off a second object (e.g., another vehicle, a bridge, a traffic barrier, a guard rail, etc.), or multiple intervening objects or surfaces, before returning to radar device. In such examples, the azimuth and/or elevation parameters of the radar return signal from the transmitted radio wave may correspond to the second object, since the second object was the last surface from which the radio wave reflected. However, the range parameter of the radar data may indicate that the detected object is at a distance (e.g., has a range) consistent with the distance of the first object (e.g., the distance the radio wave traveled). As such, the range parameter may be larger than the true range value. In some cases, multipath radar return may cause the radar device to detect an actual object at an inaccurate location. Additionally or alternatively, the radar device may falsely determine a detection of a non-existent object at a location behind an actual object. In some examples, as the autonomous vehicle navigates throughout the environment, the autonomous vehicle may determine that a "mirrored" object (e.g., a false object detection behind an actual object) has a trajectory that may intersect or otherwise affect the trajectory of the autonomous vehicle. Consequently, the autonomous vehicle may disengage from the trajectory, determine alternative and unnecessary trajectories, and/or transition from an autonomous driving mode to a manual driving mode based on the detection of the mirrored object.

To address the technical problems and inefficiencies of inaccurately detecting and/or classifying objects within an environment, the techniques described herein include radar multipath return detection using multiple virtual arrays. In some examples, the radar data detection and/or analysis system (which also may be referred to as a "radar multipath controller" or "multipath controller") may be configured to detect multipath radar returns in radar data caused by radio waves reflecting off multiple surfaces within the driving environment. The multipath controller may be further configured to refine such radar data based on multipath detections. Initially, the multipath controller may receive radar data captured by radar sensors of an autonomous vehicle traversing within an environment. In some examples, the autonomous vehicle may include multiple radar devices configured to receive radar data of the driving environment. Further, each radar device may provide unique radar data representative of the perspective of the radar device. Such radar devices may be a same or different type of radar device configured to capture different types (or parameters) of radar data, including but not limited to range data, azimuth data, RCS data, doppler data, elevation data, etc. In some examples, the autonomous vehicle may process such radar data at a raw radar data level prior to determining radar points and/or a radar point cloud.

In some examples, the multipath controller may determine a first virtual array with which to process the raw radar data. Radar device apertures may include any number of physical antennae designed to transmit and/or receive radio waves. Such physical antennae may be spaced and positioned in a particular arrangement within the aperture based on the intended use and/or purpose of the radar device. In some examples, virtual arrays may be based on the arrangement of physical antennae within the radar aperture. For instance, a radar device may have and/or use a specific virtual array with which to process radar data based on the number and position of physical transmitting antennae, and the number and position of physical receiving antennae. In some examples, a virtual array may include numerous virtual antennae, and as such, the virtual array may enhance the accuracy with which the various radar parameters are determined. The number and position of virtual antennae of the virtual array may be based on the physical antennae. In some examples, the number of virtual antennae may be based on a product of the physical transmitting antennae and the physical receiving antennae. The virtual antennae of the virtual array may be utilized to process an incoming radio wave (e.g., direct path return, multipath return, etc.). In such examples, the multipath controller may store the radar data associated with the radio wave (e.g., transmitted and received by the physical antennae) to enable the multipath controller to perform processing operations on such radar data using various virtual arrays.

In some examples, the multipath controller may determine a first attribute of the radar data and/or vehicle. In some examples, the attribute may be based on processing the radar data with the first virtual array. In some cases, the processing of the radar data described herein may be performed at a raw radar data level (e.g., at a time when radar points and/or a radar point cloud associated with the radar data have not yet been determined). In such examples, the multipath controller may perform one or more data processing operations on the radar data using the first virtual array. Such processing operations may include performing Fourier Transforms on the radar data using the first virtual array. Based on such processing, the multipath controller may determine a first attribute of the raw radar data. In such examples, attributes of the raw radar data may include noise levels, phase information, information stored in map data, and/or other similar metrics. In some examples, noise levels may be identified by analyzing side lobe distribution data of the processed raw radar data. For example, the multipath controller may analyze side lobe data (e.g., indicative of noise within the radar data) associated with the raw radar data. In other examples, the attributes may be based on information stored in map data. Such information may include predicted angles at which multipath radio waves were received by radar devices, a pose of the vehicle, a location of the vehicle within an environment, object information (e.g., a type of object, a pose of the object, etc.), and/or any other like information. In other examples, phase information may be identified by analyzing the radio wave signal information.

In some examples, the multipath controller may determine, based on the first attribute, that there is an indication of an error (e.g., multipath return) within the radar data. Based on the type of radar device, a radar device may have expected attributes to be found within raw radar data. In some examples, the radar device may have an expected level of noise to be found within raw radar data. In such examples, the expected level of noise may be based on the type and configuration (e.g., position, spacing, etc.) of the physical transmitting and/or receiving antennae. Further, the expected level of noise may also be based on observed noise levels from a previous time (e.g., identify noise levels in previously captured sensor data). In such examples, the multipath controller may determine a level of noise to be expected within radar data captured by a particular radar device. In such examples, noise levels may be illustrated and/or measured by analyzing one or more radar side lobe distribution values. The multipath controller may compare a first noise level (e.g., determined from processing the radar data with the first virtual array) with the expected noise level (e.g., expected side lobe distribution data) of the radar device. In some examples, if a difference of the first noise level and the expected noise level exceeds a threshold value, the multipath controller may determine that the raw radar data may include an indication of an error (e.g., the first noise level has an elevated noise level). The threshold value may be determined based on past noise level observations from a previous time (e.g., in similar environments, from similar object reflections, etc.). In some examples, the multipath controller may compare the expected side lobes of the radar data (e.g., based on the radar device) with the side lobes of the raw radar data. In such examples, the multipath controller may compare intensity and/or RCS values for the respective side lobes. In some examples, the multipath controller may determine a sum of the differences of some, or all, or the first side lobes to the expected side lobes. In other examples, the multipath controller may compare a single first side lobe with a single expected side lobe. Based on comparing the intensity and/or RCS values of the expected side lobes with the intensity and/or RCS values of the side lobes associated with the raw radar data, the multipath controller may determine that the difference between the intensity and/or RCS values of the two side lobes may exceed a threshold value. The multipath controller may indicate that the radar data may include an error (e.g., based on having an elevated noise level). In other examples, the multipath controller may determine that the first attribute is associated with information stored within map data. The multipath controller may utilize map data to determine whether the radar data includes an indication of an error (e.g., multipath return received at the radar device). Alternatively or additionally, the multipath controller may use a combination of map data, noise level information, phase information, and/or any other like metric in order to determine whether the radar data includes an indication of an error. In such examples, the multipath controller may weigh the various types of attributes differently based on a number of factors (e.g., environment type, traffic flow, etc.). In some examples, the multipath controller may determine that information stored in map data matches or is similar to the current state (e.g., pose, location, etc.) of the vehicle. In other examples, the multipath controller may determine that information store in map data matches the environment within which the vehicle traverses. In such examples, the multipath controller may determine, from the map data, that the driving environment includes objects which have been identified (e.g., at a previous time) to produce multipath signals (e.g., multipath reflector). Thus, the multipath controller may utilize map data to determine whether the radar data includes a multipath radar return.

In some examples, the multipath controller may determine a second virtual array. The multipath controller may determine one or more different virtual arrays based on the indication that the raw radar data may include an error (e.g., multipath return; the first noise level exceeding the expected noise levels). The multipath controller may determine any number of additional virtual arrays that may be consistent with a multipath return. In some examples, multipath radar returns may alter the configuration and/or positioning of a virtual array. The positioning (e.g., location and/or spacing) of virtual antennae may be based on the angle at which the radio wave is transmitted and received. For non-multipath returns, the angle at which a radio wave is transmitted from the radar device is the same angle at which the radio wave is received by the radar device. In such examples, the virtual antennae of the virtual array may be evenly spaced from one antenna to another. However, for multipath returns, the angle of transmit is not the same as the receive angle. As such, the virtual antennae of the virtual array for a multipath return may be unevenly or irregularly spaced.

In some examples, the multipath controller may determine whether the raw radar data includes an error (e.g., multipath return) by re-processing the raw radar data using the any number of additional virtual arrays array (e.g., multipath virtual array). In some examples, the multipath controller may process the any number of additional virtual arrays in parallel. In such examples, if the raw radar data includes a multipath return, the noise levels should decrease upon re-processing the radar data.

In some examples, the multipath controller may determine the any number of additional virtual arrays by inferring the angle from which the radio wave was received by the radar device. The multipath controller may determine a configuration for the virtual antennae based on predicting the angle from which the radio wave was received. In some examples, the multipath controller may retrieve a predicted receive angle from map data. The multipath controller may determine that the map data contains information similar to the current environment and/or state of the vehicle. Based on such information, the multipath controller may retrieve a predicted angle stored within the map data or determine a predicted receive angle based on using the information within the map data. For example, the multipath controller may determine that the vehicle may be at a particular pose and/or location. Further, the multipath controller may determine that map data includes information indicating that when a vehicle is in a particular location and/or pose, the vehicle may receive multipath returns from a particular receive angle. The multipath controller may use the particular receive angle when determining the second virtual array(s). In other examples, the multipath controller may determine that the vehicle is within a region of the environment which has known multipath objects. Further, the multipath controller may access map data and determine that particular objects within the current driving environment may be known to produce multipath returns. As such, the multipath controller may retrieve object information (e.g., a type of object, pose of object, etc.), and determine a predicted angle at which the radio wave was received by the radar device. In such examples, the multipath controller may retrieve sensor data (e.g., radar data) of the driving environment from a previous time. The multipath controller may use the sensor data to predict an angle at which the radio wave should be received by the radar device after having reflected off a particular object. In such examples, the predicted receive angle may further be based on the position of the vehicle, object characteristics (e.g., position relative to the vehicle, surface type, surface angle, distance from the vehicle, etc.), among other factors. In other examples, the multipath controller may retrieve sensor data (e.g., image data, lidar data, etc.) that is being captured by the vehicle. Further, the multipath controller may use such sensor data to determine a position of the object from which the radio wave reflected, and use such information, in addition to the factors described above, to predict the angle the radio wave should have been received at the radar device. In some examples, the multipath controller may determine the second virtual array based on the predicted angle of arrival at the radar device.

In some examples, to determine whether the radar data includes a multipath return, the multipath controller may compare the attributes (e.g., noise level) associated with the first virtual array to the attribute (e.g., noise level) associated with the one or more second (e.g., multipath) virtual arrays. The multipath controller may perform one or more data processing operations on the raw radar data using the second virtual array(s). In such examples, the data processing may be similar or identical to those performed on the radar data with the first virtual array. Based on such processing, the multipath controller may determine a second noise level of the raw radar data. For example, the multipath controller may analyze side lobe data associated with the processed radar data. In some examples, the multipath controller may compare the first noise level (e.g., based on the first virtual array) to the second noise level (e.g., based on the second virtual array) to determine whether the radar data includes a multipath radar return. If the second noise level is lower than the first noise level, the multipath controller may determine that the radar data includes a multipath return. If the second noise level is not lower than the first noise level, the multipath controller may determine additional virtual arrays corresponding to a different angles of arrival of the radio wave at the radar device. In such examples, the multipath controller may re-process the radar data with the additional virtual arrays to determine whether the noise level decreases. Based on the second noise level being lower than the first noise level, the multipath controller may modify the radar data. In other examples, the multipath controller may compare the second noise level to a threshold value. In some examples, the threshold value may be the same or different threshold used to compare the first noise level to the expected noise level. If the second noise level is below the threshold value, the multipath controller may determine that the radar data includes a multipath return. In some examples, the multipath controller may re-process the radar data any number of times using any number of virtual arrays.

In some examples, the multipath controller may cause radar information to be stored within map data. As described above, the multipath controller may determine that radar data includes a multipath return based on utilizing the above-mentioned attributes. Based on such knowledge, the multipath controller may cause relevant information (e.g., indicative of the multipath reception) to be added to map data. Thus, the multipath controller may update the map data (e.g., associated with the environment) to include an indication of the multipath signal. Such relevant information may include a pose of the vehicle, a location and/or region of the vehicle, a predicted receive angle of the radio wave associated with the multipath signal, object information (e.g., object type, object pose, object location, indication that the object is a radar reflector, etc.), a position of the vehicle relative to an object (e.g., reflecting object), and/or any other similar metric. Further, the type of radar reflector may be indicative of a radar radiation reflection pattern associated with the object.

In some examples, the multipath controller may modify the radar data. Based on determining that the second noise level is less than the first noise level or that the second noise level is below a threshold value, the multipath controller may modify the radar data. In some examples, the multipath controller may modify the radar data based on a variety of techniques. In some examples, the raw radar data may be represented by a 3D or 4D heatmap of the driving environment. In such examples, the multipath controller may identify and/or tag regions (e.g., according to range, doppler, azimuth, and/or elevation values) of the heatmap which have been determined to include a multipath return. The multipath controller may perform one or more processes to the raw radar data to transform (e.g., CFAR thresholding algorithm) the raw radar data to radar points and/or a radar point cloud. In such examples, the multipath controller may identify and remove potential radar observations (e.g., radar points) from the radar point cloud which have parameter values (e.g., range value, doppler value, azimuth value, and/or elevation value) that correspond to regions of the heatmap that were tagged as having a multipath return. Alternatively, the multipath controller may assign a low confidence level to multipath radar points. After modifying the radar data and/or determining radar points and/or point clouds based on the modified radar data, the multipath controller may send the modified radar data to various downstream components (e.g., a perception component, prediction multipath return, and/or planning component) for further processing. In such examples, the modified radar data may be further analyzed and processed for use in detecting objects, classifying objects, predicting trajectories, and/or planning future vehicle actions.

As illustrated by these examples, the techniques described herein can improve the functioning, safety, and efficiency of the autonomous and semi-autonomous vehicles operating in various driving environments. The use of multipath detecting techniques described herein may allow the vehicle to more efficiently and accurately detect multipath radar returns within raw radar data captured by radar devices on the vehicle. For example, an autonomous vehicle may determine multipath radar returns at the raw radar data level. Further, techniques described herein allow the autonomous vehicle to identify the multipath returns prior to the radar data being transformed into radar points, and therefore the autonomous vehicle identifies multipath returns before they are generated into radar points and potentially relied upon. Such techniques may prevent the autonomous vehicle from relying on such multipath radar points, and therefore the autonomous vehicle does not need to alter its trajectory, stop abruptly, or disengage the autonomous vehicle from an autonomous mode. In further examples, by performing the processes described herein, the techniques described herein can improve computing efficiencies. Such techniques may reduce the number of radar points within a radar point cloud, enabling further processing components to perform operations more quickly with less computing overhead.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like.

FIG. 1 is a pictorial flow diagram illustrating an example process 100 for modifying received radar data using virtual arrays. Some or all of the operations in process 100 may be performed by a radar multipath controller 102 configured to receive, analyze, and modify radar data based on determining multipath radar returns. In various examples, the radar multipath controller 102 may be integrated into a radar device and/or into one or more sensor data analysis components such as a perception component, prediction component, planning component, and/or other components within an autonomous vehicle.

At operation 104, the radar multipath controller 102 may receive radar data collected by one or more radar devices of an autonomous vehicle. In some examples, a vehicle may include multiple radar devices mounted at various locations and various angles relative to the vehicle, to capture radar data of a driving environment. For example, box 106 illustrates an autonomous vehicle 108 navigating a driving environment and capturing radar data reflected from a plurality of objects. In this example, the autonomous vehicle 108 is approaching a junction including a first object 110 and a second object 112. As shown in box 106, the first object 110 may be a vehicle and the second object 112 may be a vehicle. In other examples, the radar data captured by a radar device may include any number of objects, each of which may be any type of dynamic or static object. In other examples, there may be more or less objects at various locations within the environment.

As shown in box 106, the radar multipath controller 102 may receive radar data from a radar device mounted on the autonomous vehicle 108. As described above, the autonomous vehicle 108 may have one or multiple radar devices configured to capture radar data of a driving environment. In some examples, radar devices may be mounted on any surface of the autonomous vehicle 108. As shown in box 106, a radar device of the autonomous vehicle 108 may transmit and receive a radio wave 114. In this example, the radio wave 114 first reflected off of the first object 110, and subsequently reflected off of the second object 112 prior to returning to the radar device. As such, the radio wave may be a multipath radar return. In such examples, the angle at which the radio wave 114 was transmitted from the radar device differs from the angle at which the radio wave 114 is received by the radar device. Accordingly, based on the radio wave 114 being a multipath radar return, the radar data associated with the radio wave 114 may have inaccurate radar parameter values (e.g., azimuth, range, doppler, and/or elevation).

At operation 116, the radar multipath controller 102 may determine a first attribute based on processing radar data using a first virtual array. As described above, the first attribute may include any one or noise levels, phase information, information from map data, and/or any other similar metric. The radar multipath controller 102 and/or other components within the perception component of the vehicle may evaluate noise levels of the radar data captured from within a driving environment. As described above, the radar multipath controller 102 may perform various data processing operations and/or functions on the received raw radar data. Further, such processing may include performing Fourier Transforms on the radar data. Based on having processed the raw radar data, the radar multipath controller 102 may analyze side lobe data (e.g., indicative of noise within the radar data) associated with the radar data. Side lobes associated with raw radar data may indicate the level of noise present within radar data. For example, box 118 illustrates a set of radar lobes representative of the raw radar data captured by the autonomous vehicle 108. In some examples, the set of radar lobes may be associated with, and indicative of, the radio wave 114 from box 106. In this example, the set of lobes may include a main lobe 120, and various side lobes 122. As shown in box 118, the set of radar lobes may include numerous side lobes 122 at varying angles. In other examples, the set of radar lobes may include more or less side lobes 122 at different and/or varying angles. Such variation of side lobes 122 may be based on the type of radar device and/or the configuration of the radar device antennae within the aperture.

As shown in box 118, the radar multipath controller 102 may utilize the RCS values from the set of radar lobes to determine a first noise level. In some examples, the main lobe 120 of the set of radar lobes may have an RCS value close to 0. Further, the radar multipath controller 102 may determine that RCS values of the side lobes 122 may vary depending on the side lobes 122 proximity to the main lobe 120. In some examples, side lobes 122 that are closest to the main lobe 120 (e.g., on either side of the main lobe 120) may have an RCS value close to −10. As the side lobes 122 get further from the main lobe 120, the RCS values of such side lobes 122 may decrease. However, this is not intended to be limiting, in some examples side lobes 122 may increase or decrease as the side lobes 122 get further from the main lobe 120.

At operation 124, the radar multipath controller 102 may determine an error within the raw radar data based on comparing the first attribute (e.g., noise level) with an expected attribute (e.g., noise level). In some examples, a radar device may expect a certain attributes within the raw radar data. For example, the radar multipath controller 102 may expect certain levels of noise within raw radar data. In such examples, the expected level of noise may be based on the type and configuration (e.g., position, spacing, etc.) of the physical transmitting and/or receiving antennae. In some examples, the radar multipath controller 102 may determine a level of noise to be expected within radar data captured by a particular radar device. In such examples, noise levels may be illustrated and/or measured by analyzing radar side lobe values. For example, box 126 illustrates the set of radar lobes associated with raw radar data being compared to an expected level of noise. In this example, the side lobes 122 indicative of the raw radar data may indicate a first noise level. Such side lobes 122 may be illustrated in box 126 in solid lines. As shown in box 126, the side lobes 122 may be compared against expected side lobes 128 and expected main lobe 130. The expected side lobes 128 may be indicative of an expected level of noise within radar data captured by a radar device. Further, the expected main lobe 130 may be indicative of an expected main lobe within radar data captured by the radar device. As shown in box 126, the expected side lobes 128 and the expected main lobe 130 may be illustrated using dashed lines.

In some examples, the radar multipath controller 102 may determine a difference between the intensity and/or RCS values of the side lobes 122 and the expected side lobes 128. In some examples, the radar multipath controller 102 may determine a sum of the differences between the values of the side lobes 122 and the expected side lobes 128. In this example, the expected side lobes 128 proximate to the main lobe 120 (e.g., on either side of the main lobe 120) may have an approximate RCS value of −20. In some examples, the radar multipath detector 102 may determine that the difference between the intensity and/or RCS values of the side lobes 122 and the expected side lobes 128 may exceed a threshold value. Based on determining that the difference between the side lobes 122 and the expected side lobes 128 exceed a threshold value, the radar multipath controller 102 may indicate that the radar data may include an error (e.g., based on having an elevated noise level).

At operation 132, the radar multipath controller 102 may modify the radar data based on determining that the second attribute (e.g., noise level) is less than the first attribute (e.g., noise level) or that the second attribute is below a second threshold value. In some examples, the radar multipath controller 102 may determine any number of additional virtual arrays based on the indication that the raw radar data may include an error (e.g., multipath return). The radar multipath controller 102 may determine any number of additional virtual arrays that may be consistent with a multipath return. As described above, the positioning (e.g., location and/or spacing) of virtual antennae within a virtual array may be based on the angle at which the radio wave is transmitted and received. For multipath returns, the angle of transmit is not the same as the receive angle. As such, the virtual antennae of the virtual array for a multipath return may be unevenly or irregularly spaced. In some examples, the radar multipath controller 102 may determine a second virtual array based on inferring, from sensor data captured from a previous time, an angle at which the radio wave was received by the radar device. The radar multipath controller 102 may determine a configuration for the virtual antennae based on the receive angle of the radio wave. Based on determining the second virtual array(s), the radar multipath controller 102 may process the radar data using the second virtual array(s). Based on re-processing the radar data, the radar multipath controller 102 may determine a second attribute (e.g., noise level, phase information, etc.) associated with the radar data.

For example, box 134 illustrates a second set of radar lobes associated with raw radar data being compared to the expected level of noise. In some examples, the second set of radar lobes may include side lobes 136 and a main lobe 138. In this example, the side lobes 136 indicative of the raw radar data processed using the second virtual array may indicate a second noise level. Such side lobes 136 may be displayed in box 134 in solid lines. As shown in box 134, the side lobes 136 may be compared against expected side lobes 128. As described above, the expected side lobes 128 may be indicative of an expected level of noise within radar data captured by a certain type of radar device. As shown in box 132, the expected side lobes 128 may be illustrated using dashed lines.

In some examples, the radar multipath controller 102 may determine a difference between the intensity and/or RCS values of the side lobes 136 (e.g., from the second virtual array) and the expected side lobes 128. In this example, the side lobes 136 proximate to the main lobe 138 (e.g., on either side of the main lobe 138) may have an RCS value close to −20. In some examples, the radar multipath controller 102 may determine that the difference between the intensity and/or RCS values of the side lobes 136 and the expected side lobes 128 may not exceed a threshold value. In other examples, the radar multipath controller 102 may determine that the intensity and/or RCS values of the side lobes 136 are less than the intensity and/or RCS values of side lobes 122. As such, the radar multipath controller 102 may determine that the radio wave 114 is a multipath return based on the second noise levels (e.g., processed with the second virtual array) being less than the first noise levels (e.g., processed with the first virtual array).

As described above, the radar multipath controller 102 may modify the radar data. Based on determining that the second noise level is less than the first noise level or that the second noise level satisfies a second threshold, the radar multipath controller 102 may modify the radar data. In some examples, the raw radar data may be represented by a 3D or 4D heatmap of the driving environment. In such examples, the radar multipath controller 102 may identify and/or tag regions (e.g., according to range, doppler, azimuth, and/or elevation values) of the heatmap which have been determined to include a multipath return (e.g., the radio wave 114). As described above, the radar multipath controller 102 may perform one or more processes to the raw radar data to transform (e.g., CFAR thresholding algorithm) the raw radar data to radar observations (e.g., points) and/or radar point cloud. In such examples, the radar multipath controller 102 may identify and remove the radar point associated with the radio wave 114 from the radar point cloud. Alternatively, the radar multipath controller 102 may assign a low confidence level to the multipath radar point associated with the radio wave 114.

Figure 2:
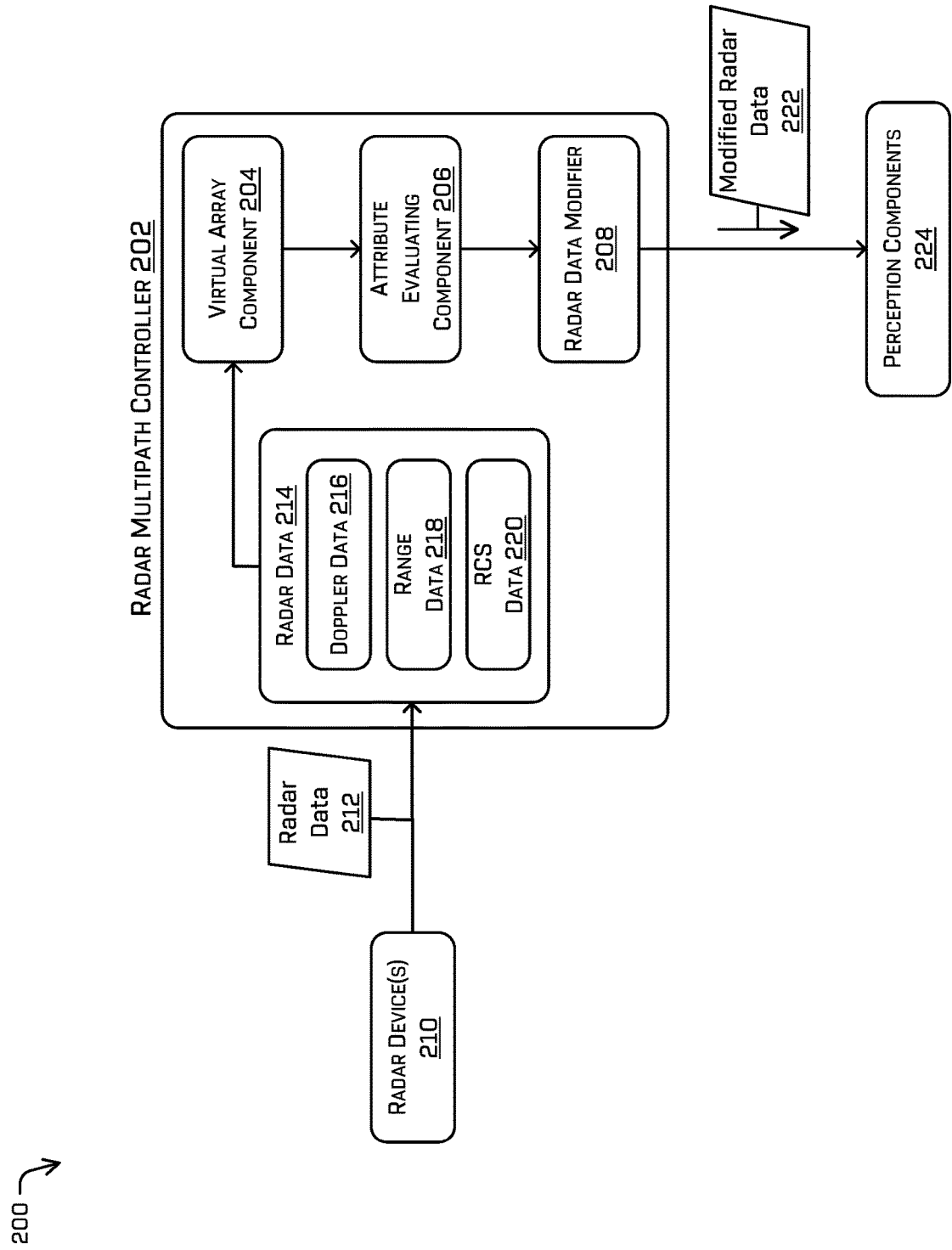
FIG. 2 illustrates an example computing system including a radar multipath controller 202 configured to modify radar data based on detecting multipath radar returns, in accordance with one or more examples of the disclosure.

FIG. 2 illustrates an example computing system including a radar multipath controller 202 configured to modify radar data based on detecting multipath radar returns.

In some examples, the radar multipath controller 202 may be similar or identical to the radar multipath controller 102 described above, or in any other examples herein. As noted above, in some cases the radar multipath controller 202 may be implemented within or otherwise associated with a perception component, prediction component, and/or planning component of an autonomous vehicle. In some examples, the radar multipath controller 202 may include various components described below, configured to perform different functionalities of a multipath detecting technique to analyze and modify radar data. For instance, the radar multipath controller 202 may include a virtual array component 204 configured to determine virtual arrays to be used in processing radar data. The radar multipath detector 202 may also include an attribute evaluating component 206 configured to evaluate attributes within raw radar data, and a radar data modifier 208 configured to modify the radar data.

In some examples, the radar multipath controller 202 may receive radar data from one or more radar device(s) 210 within (or otherwise associated with) an autonomous vehicle. Different radar device(s) 210 may be mounted or installed at different locations on the autonomous vehicle, and may include various types of radar devices providing various elements (or parameters) of radar data 212 to the radar multipath controller 202. As shown in FIG. 2, a radar device 210 may provide radar data 212 to the radar multipath controller 202. As shown in this example, the radar multipath controller 202 may include a radar data component 214 configured to receive, store, and/or synchronize radar data 212 from the radar device 210 (e.g., and any additional radar devices). The radar data component 214 may include various subcomponents, described below, to receive, store, synchronize, and/or analyze the radar data 212. A radar device may capture any number of parameters of radar data component 214 from any number of radar devices. As shown in FIG. 2, the illustrated subcomponents are some of the possible radar data parameters that a radar device may capture. In some examples, a radar device may capture more or less than the illustrated radar data components shown in FIG. 2.

In this example, the radar data component 214 may include one or more subcomponents associated with different radar data components (or parameters). As illustrated in FIG. 2, the radar device 210 may capture radar data 212, including a doppler data component 216, range data component 218, and RCS data component 220. In some examples, depending on the type of radar device, the radar device 210 may capture additional or fewer radar data parameters. In this example, the doppler data component 216 may be used to determine, store, and/or synchronize a radial velocity of detected objects relative to the radar device 210. The range data component 218 may be used to receive, store, and/or synchronize the distance of detected objects relative to the radar device(s) 210. The RCS data subcomponent 220 may be used to store and/or synchronize RCS radar data received from radar devices 210 and may provide a measure of the reflectiveness and/or detectability of an object to the radar device 210.

In some examples, the radar multipath controller 202 may include a virtual array component 204 configured to determine virtual arrays to be used in processing radar data. The virtual array component 204 may receive raw radar data including one or more radar parameters (e.g., subcomponents). In some examples, the virtual array component 204 may use various techniques to determine one or more different virtual arrays. Such virtual arrays may be used to perform various processing functions on the raw radar data. In such examples, the virtual array component 204 may determine two primary types of radar virtual arrays. The first type of virtual array may be a non-multipath virtual array that is determined based on the arrangement of the physical radar antennae. The second type of virtual array may be a multipath virtual array that is determined based on the indication that the raw radar data has an error (e.g., multipath return).

In some examples, the virtual array component 204 may determine the multipath virtual array based on inferring an angle at which a radio wave associated with the radar data 212 was received by the radar device 210 after having reflected off a particular object. Further, the virtual array component 204 may determine how a radio wave may reflect off objects within the driving environment. Based on multipath returns altering the configuration and/or alignment of a virtual array, the virtual array component 204 may determine a multipath virtual array based on the driving environment. As described above, multipath returns, unlike non-multipath returns, have a radio wave transmit angle that is different from the angle at which the radio wave was received. The virtual array component 204 may utilize previously captured radar data to infer and/or predict the angle at which a radio wave was received by the radar device 210, as the angle at which the radio wave was received alters the spacing and/or alignment of the virtual array antennae. In other examples, the multipath controller may utilize map data to determine a predicted receive angle of the radio wave at the radar device. Further, the angle at which the radio wave is received may also be based on the proximity of the vehicle to the object, the type of object, the vehicle pose, and/or other similar factors. The virtual array component 204 may determine an alignment and/or spacing for numerous virtual antennae of a multipath virtual array based on inferring a receive angle utilizing previously captured radar data. This example is not intended to be limiting, as the virtual array component 204 may determine any number of multipath virtual arrays that may be used to determine the presence of a multipath radar return.

In some examples, the radar multipath controller 202 may include an attribute evaluating component 206 configured to evaluate the attributes (e.g., noise levels, phase information, information in map data, etc.) within raw radar data. The attribute evaluating component 206 may receive one or more virtual arrays and raw radar data from the virtual array component 204. In some examples, the attribute evaluating component 206 may perform one or more processes on the raw radar data using the non-multipath virtual array and/or the one or more multipath virtual arrays. For example, the attribute evaluating component (e.g., or a variety of other components) may perform one or more processes on the raw radar data using the non-multipath virtual array. Based on such processing, the attribute evaluating component 206 may determine a first attribute (e.g., noise level) of the raw radar data. For example, the radar multipath controller 202 may analyze side lobe data (e.g., indicative of noise) associated with the raw radar data. However, this is not intended to be limiting, the attribute evaluating component 206 may use numerous other techniques to determine and/or identify noise levels within radar data. In other examples, the attribute evaluating component 206 may determine a first attribute (e.g., information in map data) associated with the state and/or location of the vehicle.

In some examples, the attribute evaluating component 206 may determine whether the radar data includes an indication of an error. In some examples, the attribute evaluating component 206 may use a weighted combination of noise levels, map data, phase information, and/or other metrics to determine the presence of multipath signals within radar data. The attribute evaluating component 206 may determine an attribute (e.g., level of noise) to be expected within radar data. For example, the expected noise levels for each radar device may differ based on the antennae configuration and/or arrangement. As such, the attribute evaluating component 206 may determine the expected noise levels associated with the radar device. In such examples, the attribute evaluating component 206 may compare the first noise level (e.g., determined from processing the radar data using the first virtual array) with the expected noise level of the radar device. In some examples, the attribute evaluating component 206 may determine whether a difference between the first noise level and the expected noise level exceeds a threshold value. When the attribute evaluating component 206 determines that the difference between the two noise levels exceeds a threshold value (e.g., determined based on previous sensor observations), the attribute evaluating component 206 may determine that the raw radar data includes an indication of an error. For example, the attribute evaluating component 206 may compare an expected side lobe of the radar device with the side lobes of the raw radar data. Based on comparing the expected side lobes with the side lobes of the raw radar data, the attribute evaluating component 206 may determine that the difference between the two side lobes may exceed a threshold value. The attribute evaluating component 206 may indicate that the radar data may include an error (e.g., based on having an elevated noise level).

Based on the attribute evaluating component 206 determining that the raw radar data includes an indication of an error, the attribute evaluating component 206 may re-process such radar data using the one or more multipath virtual arrays received from the virtual array component 204. In some examples, the attribute evaluating component 206 may compare the first noise level (e.g., using the non-multipath virtual array) to the second noise level (e.g., using the multipath virtual array) to determine whether the radar data includes a multipath radar return. If the attribute evaluating component 206 determines that the second noise level is lower than the first noise level, then the attribute evaluating component 206 may determine that the radar data includes a multipath return. If the attribute evaluating component 206 determines that the second noise level is not lower than the first noise level, the attribute evaluating component 206 may determine a third virtual array corresponding to a different angle of arrival of the radio wave at the radar device. In such examples, the attribute evaluating component 206 may re-process the radar data using the third virtual array to determine whether the noise level decrease. Based on the second noise level being lower than the first noise level, the attribute evaluating component 206 may identify and/or tag the multipath return within the raw radar data. In other examples, the attribute evaluating component 206 may determine whether the second noise level satisfies a threshold value. Based on the second noise level being below the threshold value, the attribute component 206 may identify and/or tag the multipath return with the raw radar data.

In some examples, the attribute evaluating component 206 may identify and/or tag particular regions of the raw radar data as including a multipath return. The raw radar data may be represented in a 3D or 4D heatmap, depending on the type of the radar device. In some examples, the dimensions of the 3D or 4D heatmaps may include range data, doppler data, azimuth data, and/or elevation data. In such examples, the attribute evaluating component 206 may identify dimensions and/or regions of the heatmap which include the identified multipath radar return. For example, the attribute evaluating component 206 may determine that a radio wave associated with the radar data with specific radar data parameters (e.g., azimuth, range, doppler, and elevation) is a multipath return. As such, the attribute evaluating component 206 may tag a region of the heatmap associated with the multipath radar return based on the multipath radio wave parameters.

In some examples, the radar multipath controller 202 may include a radar data modifier 208 configured to modify the radar data. The radar data modifier 208 may receive the raw radar data and an indication of a multipath return. In some examples, the radar multipath controller 202 (e.g., or any other components) may transform the raw radar data into a radar point cloud.

In some examples, the radar data modifier 208 may modify the radar data in a variety of ways. For example, the radar data modifier 208 may modify the radar data by removing radar observations (e.g., points) of the radar point cloud that have been tagged in the heatmap as a multipath return. Further, the radar data modifier 208 may modify the radar data by assigning a lower confidence level to the radar points of the radar point cloud that have been tagged in the heatmap as a multipath return. However, these examples are not intended to be limiting, the radar data modifier 208 may modify the radar data in any number of additional ways.

As shown in this example, the radar data modifier 208 may send the modified radar data 222 to perception components 224 for further processing. In such examples, based on the radar data modifier 208 having modified the radar data 212, the radar data modifier 208 may send the modified radar data 222 to the perception components 224.

Figure 3:
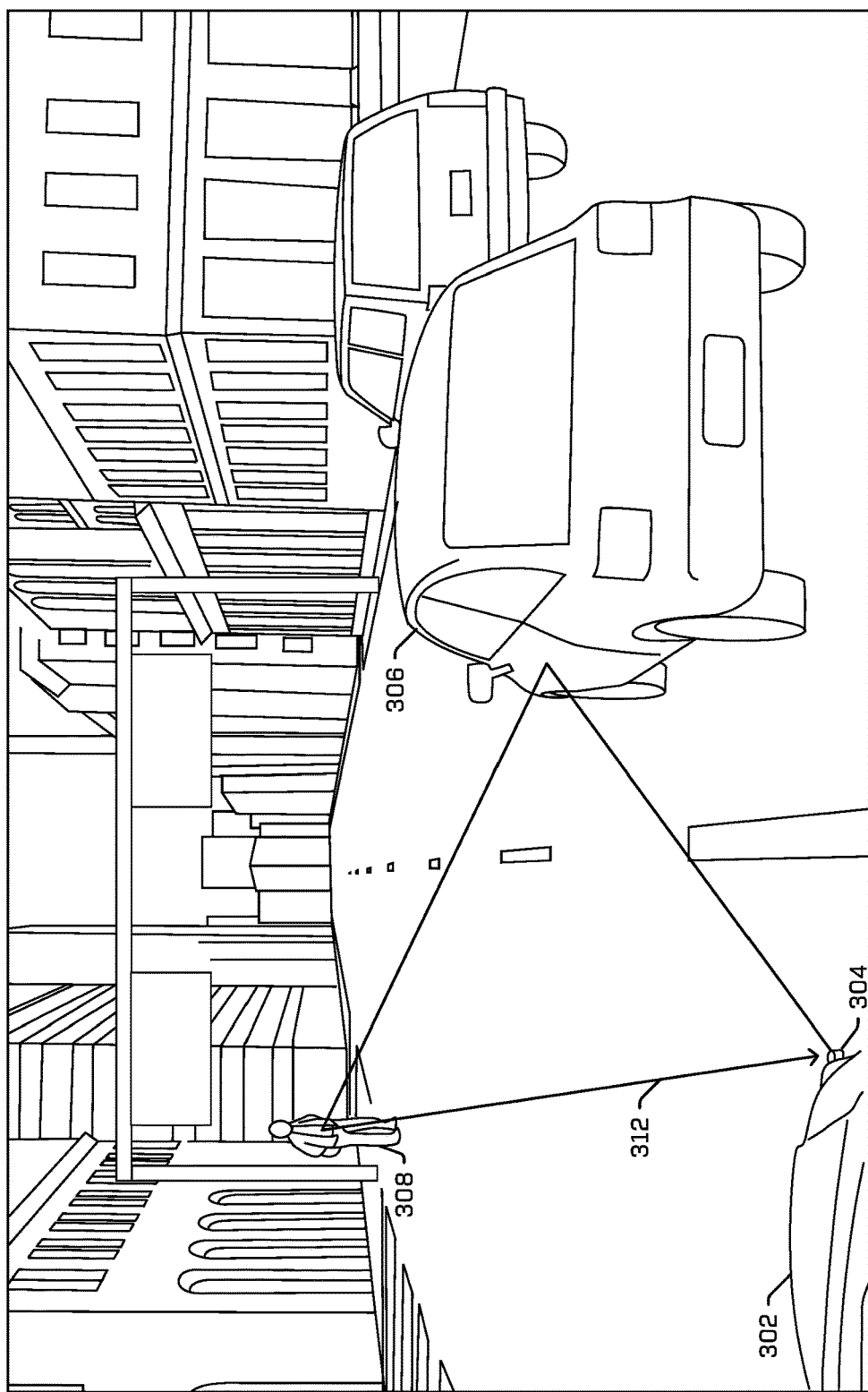
FIG. 3 depicts an example environment of a vehicle utilizing radar devices to capture radar data, in accordance with one or more examples of the disclosure.

FIG. 3 depicts an example environment 300 of a vehicle 302 utilizing radar devices to capture radar data. In some examples, the example environment 300 may be similar to the example provided in FIG. 1. Further, the example environment 300 may further illustrate an example multipath radar signal which is transmitted from a radar device at a different angle than it is received by the radar device.

In some examples, the example environment 300 may include a number of objects. In such examples, the example environment 300 may include a vehicle 302. The vehicle 302 may include a radar device 304 configured to capture radar data of the example environment 300. The radar device 304 may transmit radio waves which reflect off surfaces within the example environment 300 and return to the radar device 304. In some examples, the radar device 304 may be used to determine a distance from the radar device 304 to objects within the example environment 300. In some examples, the example environment 300 may also include a first object 306 and a second object 308. As shown, first object 306 may be a vehicle. However, in other examples the first object 306 may be any other static or dynamic object. In some examples, the second object 308 may be a pedestrian that is proximate the roadway. In other examples, the second object 308 may be any other static or dynamic object. In this example, the vehicle 302 and the first object 306 may be approaching the second object 308.

In some examples, the radar device 304 may transmit a radio wave 312 within the example environment 300. As shown, the radio wave 312 may reflect off multiple objects within the example environment 300. In this example, the radio wave 312 may travel to and reflect off the first object 306. After reflecting off the first object 306, the radio wave 312 may reflect off the second object 308 before returning to the radar device 304. In some examples, the vehicle 302 may analyze radar data associated with the radio wave 312. In such examples, the radar data associated with the radio wave 312 may indicate that the detected object has an azimuth value corresponding to the second object 308, while indicating that the detected object has a range value (e.g., distance from the radar device 304) corresponding with the second object 308. Accordingly, the vehicle 302 may determine that the radar data associated with the radio wave 312 may indicate the presence of a detected object which is occluded by the first object 306.

Figure 4A:
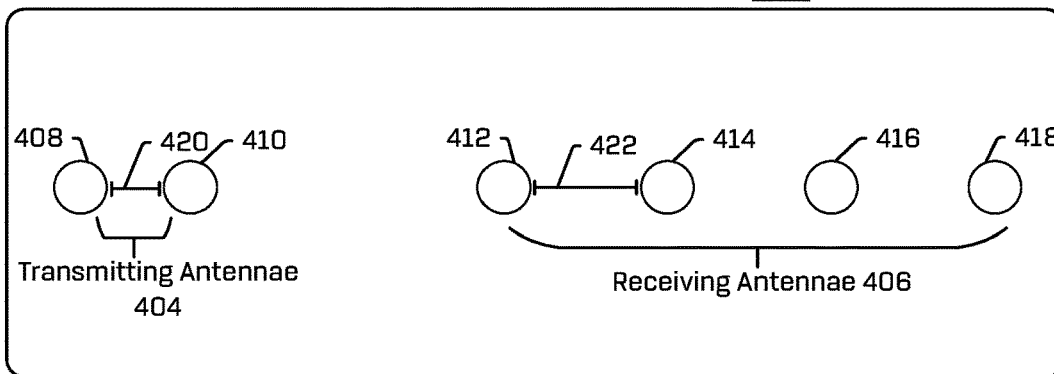
FIG. 4A illustrates an example radar aperture including a configuration of physical radar antennae, in accordance with one or more examples of the disclosure.
Figure 4B:
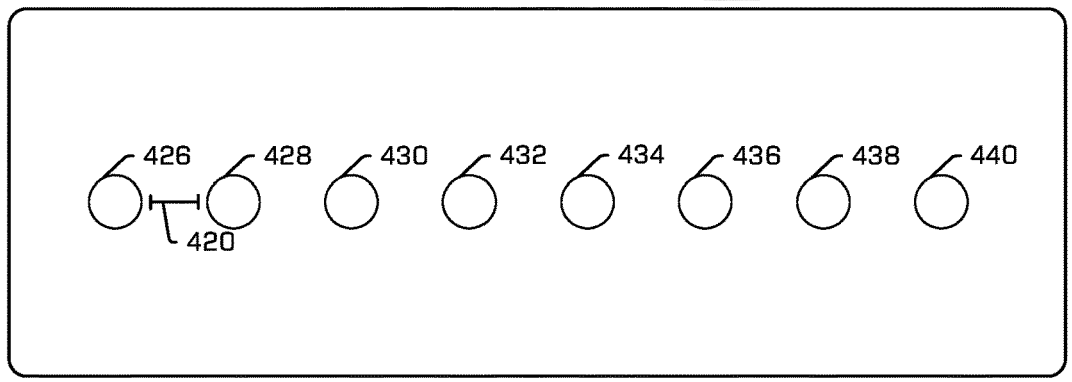
FIG. 4B illustrates an example radar aperture including a configuration of non-multipath virtual radar array, in accordance with one or more examples of the disclosure
Figure 4C:
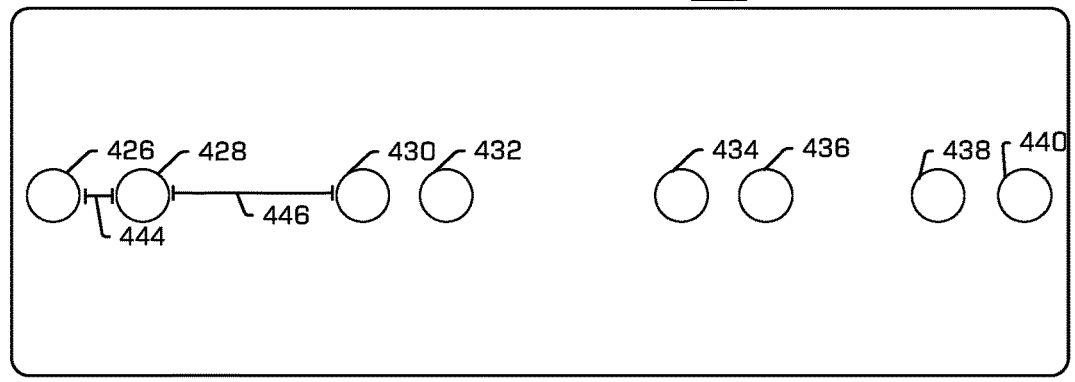
FIG. 4C illustrates an example radar aperture including a configuration of multipath virtual radar array, in accordance with one or more examples of the disclosure.

FIGS. 4A-4C depict three example radar apertures illustrating various arrangements of radar antennae that may be used to transmit and/or receive radio waves.

As described above, an autonomous vehicle may use radar devices to capture radar data of the environment around the vehicle. The radar data, along with additional sensor data and/or map data, may be analyzed by the autonomous vehicle to detect and classify various objects within the environment. In some examples, a radar device may include an aperture with one or more transmitting and/or receiving antennae. Such antennae may be spaced and positioned within the radar device aperture in a particular arrangement based on the intended use and/or purpose of the radar device. In some examples, the radar device may have a virtual array consistent with the radar device antennae arrangement. A virtual array may include numerous virtual antennae arranged based on the arrangement of the physical antennae of the radar device. Such a virtual array may assist in determining one or more parameters of radar data.

FIG. 4A illustrates an example radar aperture 400A including a configuration of physical radar antennae 402. As shown in this example, the example radar aperture 400A may represent an arrangement of physical transmitting antennae 404 and receiving antennae 406. In this example, the example radar aperture 400A may include a first transmit antenna 408 and a second transmit antenna 410. The first transmit antenna 408 and the second transmit antenna 410 may be configured to transmit radio waves from a radar device mounted on a vehicle towards various objects within a driving environment. The example radar aperture 400A may also include a number of physical receiving antennae 406. In such examples, the example radar aperture 400A may include a first receiving antenna 412, a second receiving antenna 414, a third receiving antenna 416, and a fourth receiving antenna 418. Such physical receiving antennae 406 may be configured to receive radio waves which have reflected off of one or more objects within the driving environment. In some examples, the transmitting antennae 404 may be spaced from one another at a determined distance 420. Further, the receiving antennae 406 may be spaced from one another at a determined distance 422. The distance 420 of the transmitting antennae 404 and the distance 422 of the receiving antennae 406 may be based on an intended purpose of the radar device. As described above, certain radar devices may be designed to receive a high-resolution representation of certain radar data parameters (or components), which may be achieved by positioning the transmission and reception antennae at a particular distance from one antenna to another. As shown in the example radar aperture 400A, the distance 422 between receiving antennae 406 may be spaced twice as far as the distance 420 of the transmitting antennae 404. Of course, the example radar aperture 400A discussed herein is merely an example and is not intended to be limiting. As such, in other examples, the example radar aperture 400A may include more or less transmitting and/or receiving antennae spaced at varying distances. Further, the example radar aperture 400A may include transmitting and/or receiving antennae in a variety of different configurations (e.g., various horizontal and/or vertical antennae arrangements).

In some examples, the example radar aperture 400A may be configured to transmit and receive radio waves. In such examples, the first transmit antenna 408 and the second transmit antenna 410 may transmit one or more radio waves. Further, the receiving antennas 406 may be configured to receive radio waves which were transmitted from the one or more transmit antennae. For example, the first transmit antenna 408 may transmit a single radio wave from the radar device to various locations within the environment. In such examples, each of the receiving antennae 406 may receive the radio wave and may be configured to determine one or more parameters of radar data associated with the received radio wave. The analysis and evaluation of each of the receiving antennae may contribute to the accuracy of the radar data parameters.

FIG. 4B illustrates an example radar aperture 400B including a configuration of non-multipath virtual radar array 424. As shown in this example, the example radar aperture 400B may represent an arrangement of virtual radar antennae. In this example, the example radar aperture 400B may include eight virtual radar antennae. The example radar aperture 400B may include a first virtual antenna 426, a second virtual antenna 428, a third virtual antenna 430, a fourth virtual antenna 432, a fifth virtual antenna 434, a sixth virtual antenna 436, a seventh virtual antenna 438, and an eighth virtual antenna 440. As shown in the example radar aperture 400B, each of the virtual antennae may be spaced a similar distance 420 as the transmitting antennae 404. In some examples, the number of virtual antennae within a virtual array may be based on the number of transmitting antennae 404 and receiving antennae 406. For example, the number of virtual antennae may be a product (e.g., multiplication) of the number of transmitting antennae 404 and receiving antennae 406. Of course, the example radar aperture 400B discussed herein is merely an example and is not intended to be limiting. As such, in other examples, the example radar aperture 400B may include virtual antennae configured in various arrangements based on the physical radar antenna configuration 402.

In some examples, the virtual antennae of the non-multipath virtual array 424 may be positioned and spaced based on receiving a non-multipath radar signal. In some examples, the first transmit antenna 408 may transmit a radio wave into an environment. In such examples, each receiving antennae 406 may receive the radio wave. Accordingly, the first virtual antenna 426, the third virtual antenna 430, the fifth virtual antenna 434, and the seventh virtual antenna 438 may be positioned based on the first transmit antenna 408 transmitting a radio wave, and each of the receiving antenna 406 receiving such radio wave. In other examples, the second transmit antenna 410 may transmit a radio wave into an environment. In such examples, each of the receiving antennae 406 may receive the radio wave. Accordingly, the second virtual antenna 428, the fourth virtual antenna 432, the sixth virtual antenna 436, and the eighth virtual antenna 440 may be positioned based on the second transmit antenna 410 transmitting a radio wave, and each of the receiving antenna 406 receiving such radio wave.

FIG. 4C illustrates an example radar aperture 400C including a configuration of multipath virtual radar array 442. As shown in this example, the example radar aperture 400C may represent an arrangement of virtual radar antennae. In this example, the example radar aperture 400C may include eight virtual radar antennae. The example radar aperture 400C may include the same virtual antennae as described in FIG. 4B. However, as shown in the example radar aperture 400C, the virtual antennae may be spaced at varying distances from one virtual antenna to another. For example, the first virtual antenna 426 and a second virtual antenna 428 may be spaced at a particular distance 444. Further, the third virtual antenna 430 and the fourth virtual antenna 432 may also be spaced at the same distance 444 as the first two antennae. In such examples, the second virtual antenna 428 and the third virtual array may be spaced with a larger distance 446 than the distance 444. Of course, the example radar aperture 400C discussed herein is merely an example and is not intended to be limiting. As such, in other examples, the example radar aperture 400C may include virtual antennae configured in various arrangements and spacings.

In some examples, the configuration of the multipath virtual radar array 442 may be based on inferring an angle at which the multipath signal was received at the radar device. As described above, the vehicle may use sensor data to predict an angle at which the radio was received by the radar device after having reflected off a particular object. In such examples, the predicted receive angle may further be based on the position of the vehicle, object characteristics, among other factors. In some examples, the vehicle may determine the configuration (e.g., position, spacing, etc.) second virtual array based on the predicted angle of arrival at the radar device. Additional detail about inferring the arrival angle is discussed in more detail below (FIG. 5).

Figure 5:
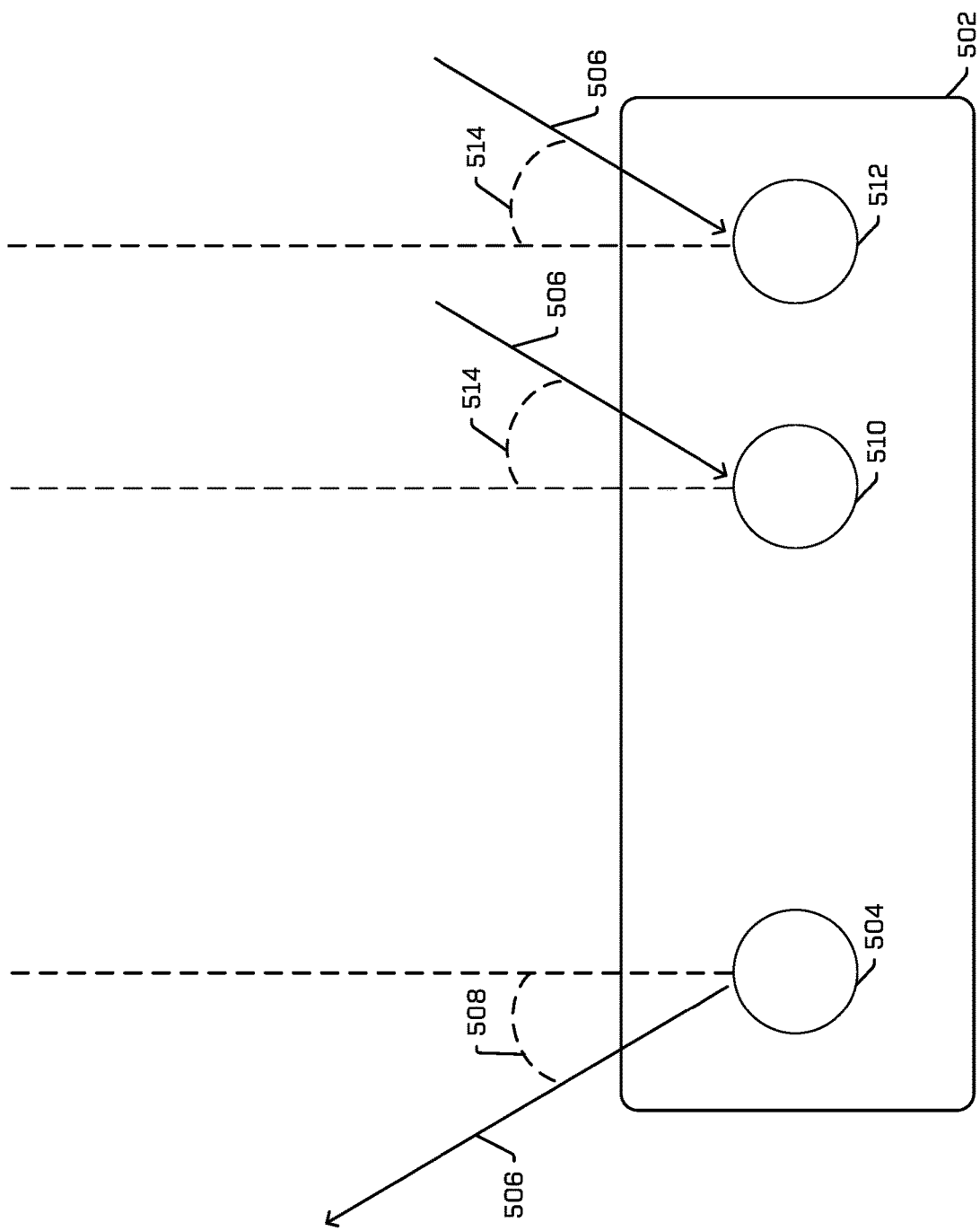
FIG. 5 depicts an example radar aperture illustrating radar antennae transmitting and/or receiving radio waves, in accordance with one or more examples of the disclosure.

FIG. 5 depicts an example radar aperture 502 illustrating radar antennae transmitting and/or receiving radio waves.

In some examples, the example radar aperture 502 may include one or more transmitting antennae. In this example, the example radar aperture 502 may include a transmitting antenna 504. As described above, the transmitting antenna may be configured to transmit one or more radio waves throughout a driving environment. As shown in FIG. 5, the transmit antenna 504 may transmit a radio wave 506 at a particular angle 508 from the example radar aperture 502. Of course, the angle 508 at which the transmitting antenna 504 transmits the radio wave 506 is merely an example and is not intended to be limiting. As such, in other examples, the transmit antenna 504 may transmit radio waves at various other angles.

In some examples, the example radar aperture 502 also may include one or more receiving radar antennae. In this example, the example radar aperture 502 may include a first receiving antenna 510 and a second receiving antenna 512. As described above, the receiving antennae may be configured to receive one or more radio waves from the driving environment. As shown in FIG. 5, the first receiving antenna 510 and the second receiving antenna 512 may receive the radio wave 506 which was transmitted by the transmitting antenna 504. Further, in this example, the receiving antennae may receive the radio wave 506 at a particular angle 514. In this example, the radio wave 506 may be a multipath radio wave, as the angle 508 of transmission is different than the angle 514 of arrival.

As described above, the vehicle may determine that captured radar data may include an error. Further, when determining a second virtual to either confirm the presence or absence of a multipath signal, the vehicle may predict an angle of arrival of the radio wave 506. In some examples, the spacing and/or overall configuration of the virtual array may be based on the angle at which the radio wave 506 was received by the first receiving antennae 510 and the second receiving antennae 512. As such, the vehicle may retrieve radar data of the driving environment from a previous time, or may retrieve information from map data. The vehicle may use the sensor data and/or map data to predict an angle at which the radio was received by the radar device after having reflected off a particular object. In such examples, the predicted receive angle may further be based on the position of the vehicle, object characteristics (e.g., position relative to the vehicle, surface type, surface angle, distance from the vehicle, etc.), among other factors. In some examples, the vehicle may determine the spacing of the virtual antennae of the second virtual array based on the predicted angle 514 of arrival at the radar device.

Figure 6:
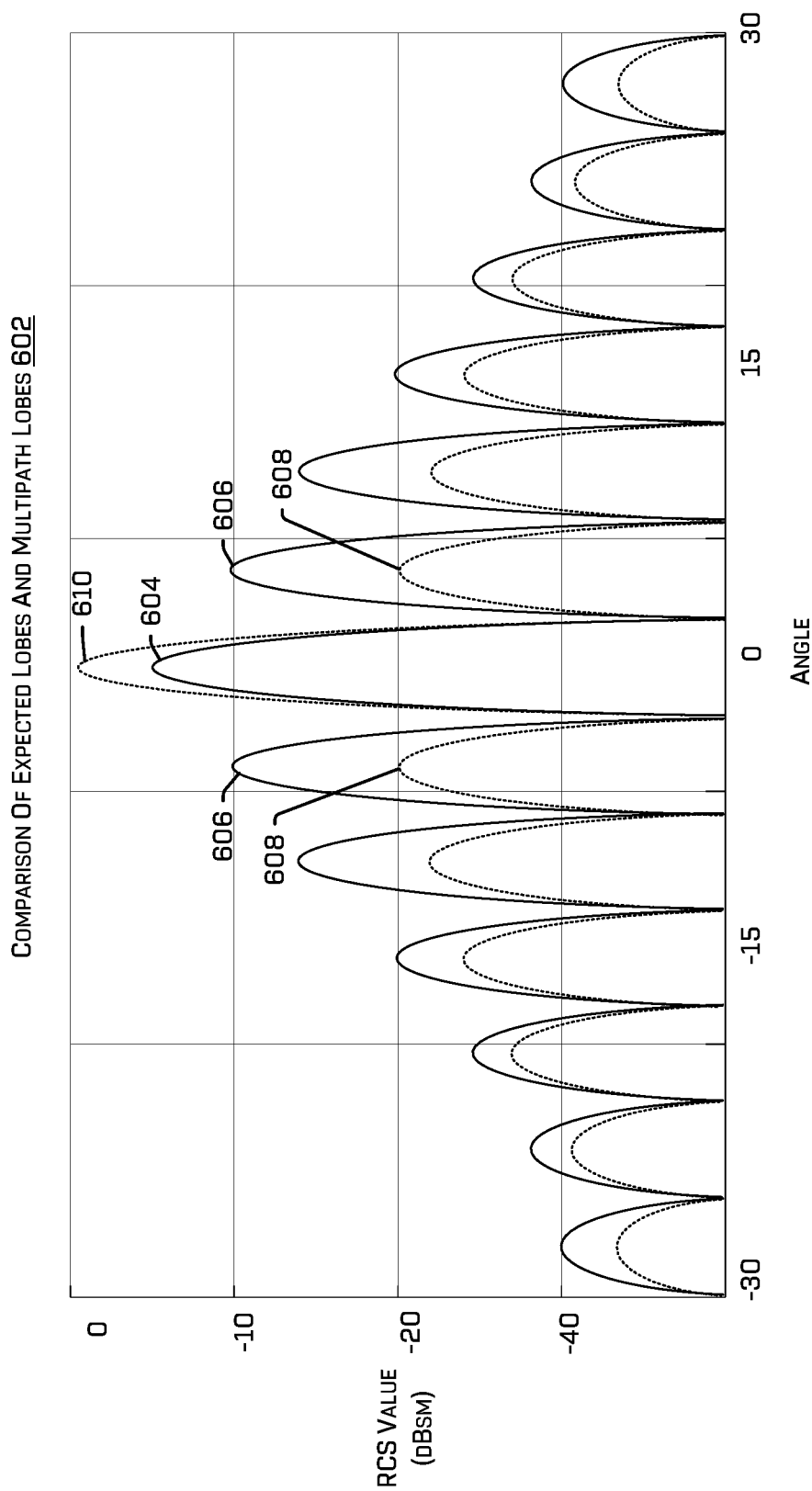
FIG. 6 depicts an example graph of example radar lobes illustrating a comparison of different sets of radar lobes, in accordance with one or more examples of the disclosure.

FIG. 6 depicts an example graph 600 of example radar lobes illustrating a comparison of different sets of radar lobes.

In some examples, the example graph 600 may include multiple sets of radar lobes (e.g., main lobes, side lobes, etc.). The example graph 600 may also include a first set of side lobes illustrated in solid lines, and a second set of side lobes illustrated in dashed lines. In some examples, the first set of side lobes may be associated with noise found within radar data which was processed using a virtual array. The second set of side lobes may be associated with a level of noise that is expected within radar data, based on a number of factors. Such factors may include, the type of the radar device, the configuration (e.g., position, spacing, etc.) of the physical antennae, the type of object from which the radio wave reflected, previous sensor data (e.g., radar data), etc. As shown in FIG. 6, a main lobe 604 of the first set of lobes may have an approximate RCS value of −5, and a side lobe 606 of the first set of side lobes may have an approximate RCS value of −10. Further, a side lobe 608 (e.g., positioned proximate the main lobe 610) of the second set of side lobes (e.g., the expected side lobes) may have an approximate RCS value of −20. Further, the expected main lobe 610 may have an approximate RCS value of 0. In some examples, the vehicle may determine whether a difference between the RCS value of the side lobe 606 and the side lobe 608 exceeds a threshold value. In some examples, if the difference exceeds a threshold value, then the vehicle may determine that the radar data has an indication of an error (e.g., multipath signal) due to elevated noise levels. If the difference does not exceed a threshold value, then the vehicle may determine that the radar data does not include a multipath signal.

Figure 7:
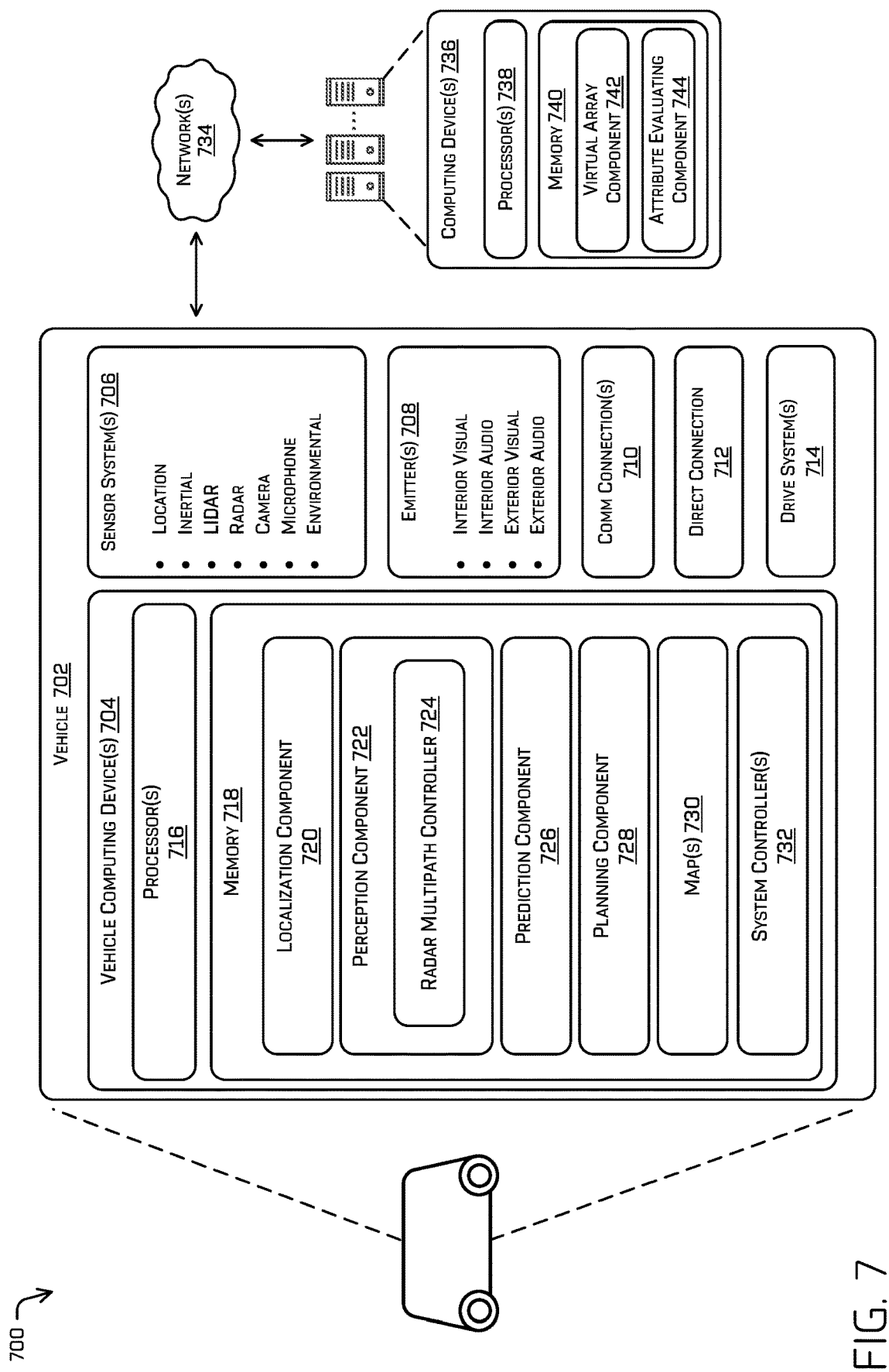
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722 including a radar multipath controller 724, a prediction component 726, a planner component 728, one or more system controllers 732, and one or more maps 730 (or map data 730). Though depicted in FIG. 7 as residing in the memory 718 for illustrative purposes, it is contemplated that the localization component 720, the perception component 722 including the one or more radar multipath controller 724, the prediction component 726, the planner component 728, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736). In some examples, the memory 740 may include a virtual array component 742 and a attribute evaluating component 744.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The radar multipath controller 724 may be configured to modify, using one or more processes described herein, radar data based on changes in virtual arrays. For example, the radar multipath controller 724 may be configured to receive radar data associated with radar devices mounted to the vehicle 702 traversing a driving environment. Additionally, the radar multipath controller 724 may be configured to determine a first noise level based on processing the radar data using a first virtual array. In some examples, the radar multipath controller 724 may determine an indication of an error within the radar data. Based on determining the indication of an error within the radar data, the radar multipath controller 202 may determine a second noise level based on re-processing the radar data using a second virtual array. In such examples, the radar multipath controller 202 and modifying the radar data based on the second noise level being less than the first noise level The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the radar multipath controller 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the radar multipath controller 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include a virtual array component 742 and an attribute evaluating component 744. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the virtual array component 742 and the attribute evaluating component 744 may perform substantially similar functions as the radar multipath controller 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 8:
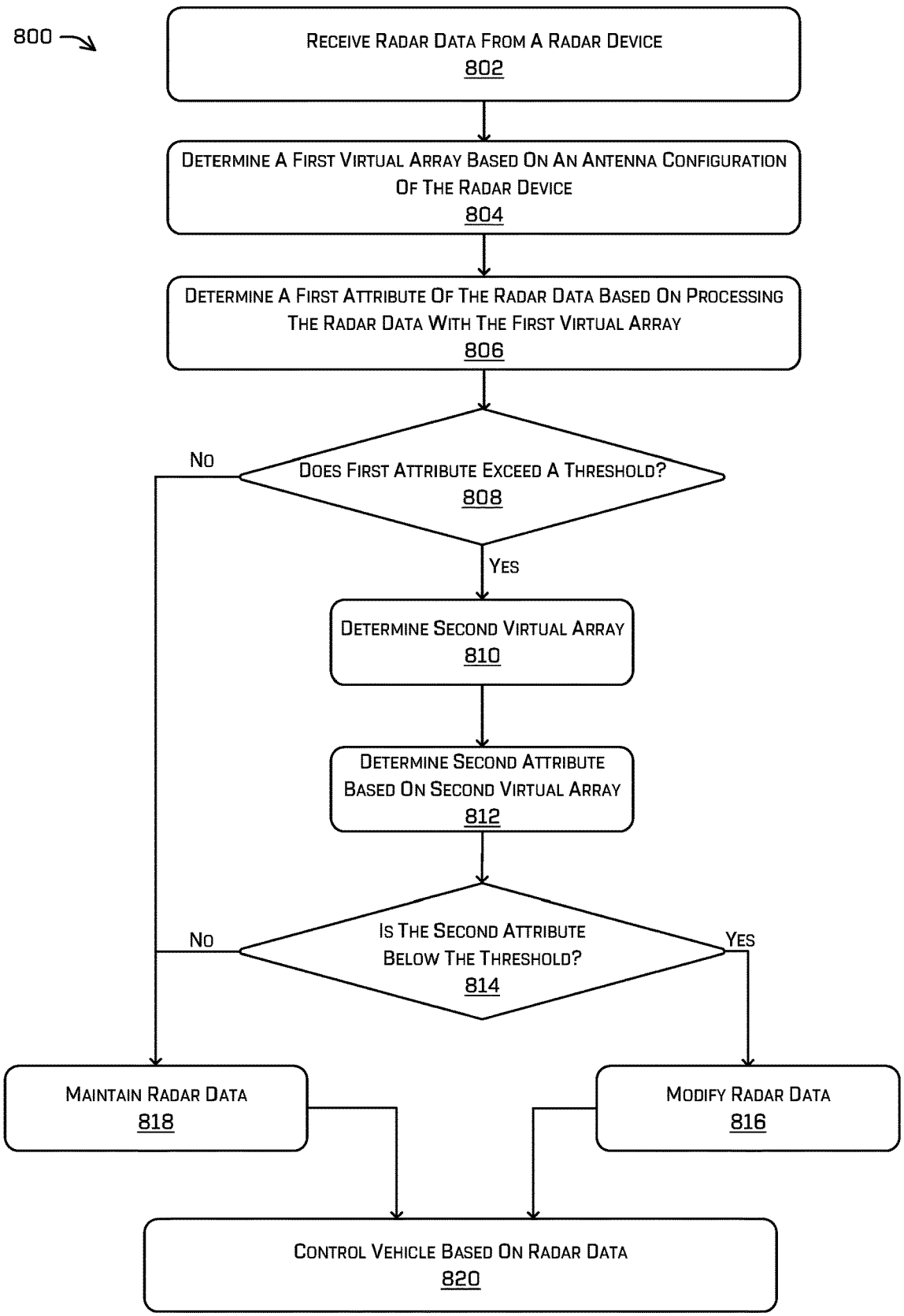
FIG. 8 is a flow diagram illustrating an example process of modifying radar data points based on detecting multipath radar signals, in accordance with one or more examples of the disclosure.

FIG. 8 is a flow diagram illustrating an example process 800 of modifying radar data points based on detecting multipath radar signals. As described below, process 800 includes operations of receiving radar data, determining a first attribute based on processing the radar data using a first virtual array, determining an indication of an error within the radar data, determining a second attribute based on re-processing the radar data using a second virtual array, and modifying the radar data based on the second attribute being less than the first noise level or the second attribute satisfying a threshold. In various examples, process 800 may be performed by one or more computer-based components configured to implement various functionalities described herein. For instance, some or all of the operations of process 800 may be performed by a radar multipath controller 202 configured to receive radar data, determine one or more non-multipath and multipath virtual arrays, evaluate noise levels within the radar data based on processing the radar data using the one or more virtual arrays, and/or modify the radar data based on a second noise level being less than the first noise level. As described above, a radar multipath controller 202 may be integrated as an on-vehicle system in some examples.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the radar multipath controller 202 may receive radar data captured by radar sensors of an autonomous vehicle traversing within an environment. In some examples, the autonomous vehicle may include multiple radar devices configured to receive radar data of the driving environment. Such radar devices may be a same or different type of radar device configured to capture different types (or parameters) of radar data, including but not limited to range data, azimuth data, RCS data, doppler data, elevation data, etc. In some examples, the autonomous vehicle may process such radar data at a raw radar data level prior to determining radar points and/or a radar point cloud.

At operation 804, the radar multipath controller 202 may determine a first virtual array with which to process the raw radar data. In some examples, virtual arrays may be based on the arrangement of physical antennae within the radar aperture. Radar device apertures may include any number of physical antennae designed to transmit and/or receive radio waves. The number and position of virtual antennae of the virtual array may be based on the number and position of the physical antennae. In some examples, the number of virtual antennae may be based on a product of the physical transmitting antennae and the physical receiving antennae. In such examples, the virtual antennae of the virtual array may be utilized to process and evaluate an incoming radio wave.

At operation 806, the radar multipath controller 202 may determine a first attribute (e.g., noise level) of the radar data based on processing the radar data with the first virtual array. Further, the radar multipath controller 202 may determine a first attribute based on information (e.g., vehicle pose, vehicle location, object information (e.g., object type, object pose, etc.), etc.) in map data. The radar data may be processed while at a raw radar data level (e.g., radar points and/or radar point cloud associated with the radar data have not yet been determined). In such examples, the radar multipath controller 202 may perform one or more processes (e.g., Fourier Transforms) to the radar data using the first virtual array. Based on such processing, the radar multipath controller 202 may determine a first noise level of the raw radar data. For example, the radar multipath controller 202 may analyze side lobe data (e.g., indicative of noise within the radar data) associated with the raw radar data.

At operation 808, the radar multipath controller 202 may determine whether the first attribute (e.g., noise level) exceeds a threshold value. A radar device may have a level of noise to be expected within raw radar data after such processing. In such examples, the expected level of noise may be based on the type and configuration (e.g., position, spacing, etc.) of the physical transmitting and/or receiving antennae. In some examples, the radar multipath controller 202 may determine a level of noise to be expected within radar data captured by a particular radar device. In such examples, noise levels may be illustrated and/or measured by analyzing radar side lobe values. The radar multipath controller 202 may compare the first noise level (e.g., determined from processing the radar data with the first virtual array) with the expected noise level of the radar device. For example, the radar multipath controller 202 may compare the intensity and/or RCS values of the expected side lobes with the intensity and/or RCS values of the side lobes associated with the raw radar data (e.g., first noise level). In such examples, the radar multipath controller 202 may determine whether the difference between the intensity and/or RCS values of the two side lobes may exceed a threshold value. In some examples, if a difference of the first noise level and the expected noise level exceeds a threshold value (808: Yes), the radar multipath controller 202 may determine that the raw radar data may include an indication of an error (e.g., the first noise level has an elevated noise level).

At operation 810, the radar multipath controller 202 may process a second virtual array. The radar multipath controller 202 may determine the any number of additional virtual arrays based on the indication that the raw radar data may include an error (e.g., multipath return), as determined in operation 808. The radar multipath controller 202 may determine a second virtual array(s) that may have decreased noise levels when processing a multipath return. In some examples, multipath returns may alter the configuration and/or positioning of a virtual array. The positioning (e.g., location and/or spacing) of virtual antennae may be based on an angle at which the radio wave is transmitted and received by the radar device. For non-multipath returns, the angle at which a radio wave is transmitted from the radar device is the same angle at which the radio wave is received by the radar device. In such examples, the virtual antennae of the virtual array may be evenly spaced from one antenna to another. However, for multipath returns, the angle of transmit is not the same as the receive angle. As such, the virtual antennae of the virtual array for a multipath return may be unevenly or irregularly spaced. In some examples, the radar multipath controller 202 may determine a second virtual array based on inferring an angle at which the radio wave was received by the radar device. In such examples, the radar multipath controller 202 may retrieve sensor data (e.g., radar data) from a previous time or retrieve information from map data, and use such sensor or map data to predict an angle at which the radio was received by the radar device after having reflected off a particular object. In such examples, the predicted receive angle may further be based on the position of the vehicle, location of the vehicle, object characteristics (e.g., position relative to the vehicle, surface type, surface angle, distance from the vehicle, etc.), among other factors. In some examples, the multipath controller may determine the second virtual array based on the predicted angle of arrival at the radar device.

At operation 812, the radar multipath controller 202 may determine a second noise level based on processing the radar data with the second virtual array. The radar multipath controller 202 may perform one or more processes on the raw radar data using the any number of additional virtual arrays. In such examples, the radar multipath controller 202 may perform similar or identical processes to those performed on the radar data with the first virtual array. Based on such processing, the radar multipath controller 202 may determine a second noise level of the raw radar data.

At operation 814, the radar multipath controller 202 may determine whether the second noise level is below a threshold value. In some examples, the radar multipath controller 202 may compare the first noise level (e.g., based on the first virtual array) to the second noise level (e.g., based on the second virtual array) to determine whether the radar data includes a multipath radar return. For example, the radar multipath controller 202 may analyze the second noise level by evaluating side lobe data associated with the re-processed radar data. In other such examples, the radar multipath controller 202 may determine compare the second noise levels to the expected noise levels, and determine whether the difference is below the threshold value. If the second noise level is lower than the first noise level (814: Yes), the radar multipath controller 202 may determine that the radar data includes a multipath return and modify the radar data.

At operation 814, the radar multipath controller 202 may modify the radar data. Based on determining that the second noise level is less than the first noise level or that the second noise level is below a threshold value, the radar multipath controller 202 may modify the radar data. In some examples, the radar multipath controller 202 may modify the radar data using a variety of techniques. In some examples, the raw radar data may be represented by a 3D or 4D heatmap of the driving environment. In such examples, the radar multipath controller 202 may identify and/or tag regions (e.g., according to range, doppler, azimuth, and/or elevation values) of the heatmap which have been determined to include a multipath return. The radar multipath controller 202 may transform the raw radar data to radar points and/or a radar point cloud. In such examples, the radar multipath controller 202 may identify and remove radar points from the radar point cloud which have parameter values (e.g., range value, doppler value, azimuth value, and/or elevation value) that correspond to regions of the heatmap which were tagged as having a multipath return. Alternatively, the radar multipath controller 202 may assign a lower confidence level to the multipath radar point.

In contrast, if the radar multipath controller 202 determines that the radar data does not exceed a threshold (808: No), or if the second noise level is not below a threshold (814: No), then, at operation 818, the radar multipath controller 202 may maintain (e.g., not modify) the radar data.

At operation 820, the radar multipath controller 202 may control the autonomous vehicle based on the radar data. For example, the radar data modified in operation 816, or maintained in operation 818, may be sent to one or more perception components for further processing. In such examples, the radar data may be used to accurately detect and classify objects within a driving environment. Further, the radar data may be used to assist in predicting future actions for one or more objects within a driving environment, in addition to predicting future actions for the autonomous vehicle.

EXAMPLE CLAUSES

A: A system comprising: one or more processors; and one or more non-transitory computer-readable media storing computer-executable instructions that, when executed, cause the system to perform operations comprising: receiving, from a radar device, radar data associated with a vehicle operating in an environment; determining, based at least in part on a physical antenna of the radar device, a first virtual array; processing the radar data using the first virtual array; determining, based at least in part on processing the radar data using the first virtual array, a first value of an attribute associated with the radar data; determining that the first value meets or exceeds a first threshold; processing, based at least in part on the first value meeting or exceeding the first threshold, the radar data using a second virtual array of the physical antenna; determining, based at least in part on processing the radar data using the second virtual array, a second value of the attribute of the radar data; determining, based at least in part on determining that the second value is lower than the first value or that the second value is below a second threshold, modified radar data; and controlling, based at least in part on the modified radar data, an operation of the vehicle within the environment.

B: The system of paragraph A, wherein determining that the first value exceeds the threshold is based at least in part on comparing a first distribution of first side lobe data associated with the first value with a second distribution of second side lobe data associated with an expected value. The system of paragraph A, wherein determining the second virtual array comprises: determining a predicted angle associated with the radar data received by the radar device.

D: The system of paragraph A, wherein determining that the first value exceeds the first threshold comprises: determining a first radar cross section value associated with a first side lobe of the radar data; determining, based at least in part on the first virtual array, a second radar cross section value associated with an expected side lobe of the radar data; and determining that a difference between the first radar cross section value and the second radar cross section value meets or exceeds the first threshold. The system of paragraph A, wherein determining the modified radar data comprises at least one of: determining, based at least in part on the radar data, a set of potential radar observations; and modifying the set of potential radar observations, based at least in part on determining that the second value is lower than the first value or that the second value is below the second threshold, wherein the modifying comprises at least one of: removing a radar observation of the set of potential radar observations; or assigning a confidence level to a radar observation of the set of potential radar observations. One or more non-transitory computer-readable media storing instructions executable by a processor, wherein the instructions, when executed, cause the processor to perform operations comprising: receiving, from a radar device, radar data associated with an environment; determining, based at least in part on a physical antenna of the radar device, a first virtual array; processing the radar data using the first virtual array; determining, based at least in part on processing the radar data using the first virtual array, a first value of an attribute associated with the radar data; determining that the first value exceeds a threshold; processing, based at least in part on the first value exceeding the threshold, the radar data using a second virtual array; determining, based at least in part on processing the radar data using the second virtual array, a second value of the attribute; and determining, based at least in part on the second value, modified radar data.

G: The one or more non-transitory computer-readable media of paragraph F, wherein determining that the first value exceeds the threshold is based at least in part on comparing a first distribution of first side lobe data associated with the first value with a second distribution of second side lobe data associated with an expected value.

H: The one or more non-transitory computer-readable media of paragraph F, wherein determining the second virtual array comprises: determining a predicted angle associated with the radar data received by the radar device.

I: The one or more non-transitory computer-readable media of paragraph F, wherein determining that the first value exceeds the threshold comprises: determining a first radar cross section value associated with a first side lobe of the radar data; determining, based at least in part on the first virtual array, a second radar cross section value associated with an expected side lobe of the radar data; and determining that a difference between the first radar cross section value and the second radar cross section value exceeds the threshold.

J: The one or more non-transitory computer-readable media of paragraph F, wherein the threshold is a first threshold, and wherein determining the modified radar data comprises at least one of: determining, based at least in part on the radar data, a set of potential radar observations; and modifying the set of potential radar observations, based at least in part on determining that the second value is lower than the first value or that the second value is below a second threshold, wherein the modifying comprises at least one of: removing a radar point of the set of potential radar observations; or assigning a confidence level to a radar observation of the set of potential radar observations.

K: The one or more non-transitory computer-readable media of paragraph F, wherein the threshold is a first threshold, the operations further comprising: determining a difference between the second value and the first value; modifying the radar data is based at least in part on any one of: comparing the difference to a second threshold; or determining that the second value is below the second threshold.

L: The one or more non-transitory computer-readable media of paragraph F, the operations further comprising: determining, based at least in part on the first value exceeding the threshold, a third virtual array; determining, based at least in part on processing the radar data using the third virtual array, a third value of the attribute of the radar data; and comparing the third value to the first value or the third value to a second threshold.

M: The one or more non-transitory computer-readable media of paragraph F, the operations further comprising: controlling, based at least in part on the modified radar data, the operation of a vehicle within the environment.

N: A method comprising: receiving, from a radar device, radar data associated with an environment; determining, based at least in part on a physical antenna of the radar device, a first virtual array; processing the radar data using the first virtual array; determining, based at least in part on processing the radar data using the first virtual array, a first value of an attribute associated with the radar data; determining that the first value exceeds a threshold; processing, based at least in part on the first value exceeding the threshold, the radar data using a second virtual array; determining, based at least in part on processing the radar data using the second virtual array, a second value of the attribute; and determining, based at least in part on the second value, modified radar data.

O: The method of paragraph N, wherein determining the that the first value exceeds the threshold is based at least in part on comparing a first distribution of first side lobe data associated with the first value with a second distribution of second side lobe data associated with an expected value.

P: The method of paragraph N, wherein determining the second virtual array comprises: determining a predicted angle associated with the radar data received by the radar device.

Q: The method of paragraph N, wherein determining that the first value exceeds the threshold comprises: determining a first radar cross section value associated with a first side lobe of the radar data; determining, based at least in part on the first virtual array, a second radar cross section value associated with an expected side lobe of the radar data; and determining that a difference between the first radar cross section value and the second radar cross section value exceeds the threshold.

R: The method of paragraph N, wherein the threshold is a first threshold, and wherein determining the modified radar data comprises at least one of: determining, based at least in part on the radar data, a set of potential radar observations; and modifying the set of potential radar observations, based at least in part on determining that the second value is lower than the first value or that the second value is below a second threshold, wherein the modifying comprises at least one of: removing a radar point of the set of potential radar observations; or assigning a confidence level to a radar observation of the set of potential radar observations.

S: The method of paragraph N, wherein the threshold is a first threshold, further comprising: determining, based at least in part on the first value exceeding the first threshold, a third virtual array; determining, based at least in part on processing the radar data using the third virtual array, a third value of the attribute of the radar data; and comparing the third value to the first value or the third value to a second threshold.

T: The method of paragraph N, further comprising: controlling, based at least in part on the modified radar data, an operation of a vehicle within the environment.

U: A system comprising: one or more processors; and one or more computer-readable media storing computer-executable instructions that, when executed, cause the one or more processors to perform operations comprising: receiving, from a radar device, radar data associated with a vehicle operating in an environment; determining, based at least in part on a physical antenna configuration of the radar device, a first virtual array; processing the radar data using the first virtual array, into first processed radar data; determining, based at least in part on the first processed radar data, a first attribute associated with at least one of the radar data or the vehicle; determining, based at least in part on the first attribute, that the first processed radar data is associated with a multipath signal; processing, based at least in part on the first attribute being associated with the multipath signal, the radar data using a second virtual array, into second processed radar data; updating, based at least in part on the first attribute being associated with the multipath signal, map data associated with the environment to include an indication of the multipath signal; and controlling, based at least in part on second processed radar data, an operation of the vehicle within the environment.

V: The system of paragraph U, wherein the map data is updated to comprise at least one of: an angle associated with the multipath signal and a pose of the vehicle or a region in which the vehicle is traversing; or object information associated with an object detected using the radar data, wherein the object information comprises a location of the object and a second indication that the object is a radar reflector.

W: The system of any of paragraphs U or V, wherein the first attribute comprises at least one of: a noise level associated with the radar data; a pose of the vehicle within the environment; a region of the vehicle traversing within the environment; or a position of the vehicle relative to an object detected in the radar data.

X: The system of any of paragraphs U-W, wherein determining that the first attribute is associated with the multipath signal is based at least in part on at least one of the map data, a noise level associated with the radar data, or phase information associated with the radar data.

Y: The system of any of paragraphs U-X, the operations further comprising: determining the second virtual array for processing the radar data, wherein the second virtual array is determined is based at least in part on the map data.

Z: One or more non-transitory computer-readable media storing instructions executable by a processor, wherein the instructions, when executed, cause the processor to perform operations comprising: receiving, from a radar device, radar data associated with a vehicle operating in an environment; determining, based at least in part on a configuration of an antenna of the radar device and the radar data, a multipath reception at the radar device; and updating, based at least in part on the determining the multipath reception, map data associated with the environment indicative of the multipath reception.

AA: The one or more non-transitory computer-readable media of paragraph Z, wherein the map data is updated to comprise at least one of: an angle associated with the multipath reception and a pose of the vehicle or a region in which the vehicle is traversing; or object information associated with an object detected using the radar data, wherein the object information comprises a location of the object and an indication that the object is a radar reflector.

AB: The one or more non-transitory computer-readable media of any of paragraphs Z or AA, wherein the object information further comprises a type of radar reflector of the object.

AC: The one or more non-transitory computer-readable media of any of paragraphs Z-AB, wherein the type of radar reflector is indicative of a radar radiation reflection pattern for the object.

AD: The one or more non-transitory computer-readable media of any of paragraphs Z-AC, wherein the determining, based at least in part on the configuration of the antenna of the radar device and the radar data, the multipath reception at the radar device includes applying a first virtual radar array to the radar device.

AE: The one or more non-transitory computer-readable media of any of paragraphs Z-AD, the operations further comprising: determining a second virtual array for processing the radar data, wherein the second virtual array is determined is based at least in part on a first attribute corresponding to processing the radar data via a first virtual array.

AF: The one or more non-transitory computer-readable media of any of paragraphs Z-AE, the operations further comprising: determining, based at least in part on the radar data used to determine the multipath reception, a direct path reception at the radar device.

AG: The one or more non-transitory computer-readable media of any of paragraphs Z-AF, the operations further comprising: controlling, based at least in part on the radar data, an operation of the vehicle within the environment.

AH: A method comprising: receiving, from a radar device, radar data associated with a vehicle operating in an environment; determining, based at least in part on a configuration of an antenna of the radar device and the radar data, a multipath reception at the radar device; and updating, based at least in part on the determining the multipath reception, map data associated with the environment indicative of the multipath reception.

AI: The method of paragraph AH, wherein the map data is updated to comprise at least one of: an angle associated with the multipath reception and a pose of the vehicle or a region in which the vehicle is traversing; or object information associated with an object detected using the radar data, wherein the object information comprises a location of the object and an indication that the object is a radar reflector.

AJ: The method of any of paragraphs AH or AI, wherein the object information further comprises a type of radar reflector of the object.

AK: The method of any of paragraphs AH-AJ, wherein the type of radar reflector is indicative of a radar radiation reflection pattern for the object.

AL: The method of any of paragraphs AH-AK, wherein the determining, based at least in part on the configuration of the antenna of the radar device and the radar data, the multipath reception at the radar device includes applying a first virtual radar array to the radar device.

AM: The method of any of paragraphs AH-AL, further comprising: determining, based at least in part on the radar data used to determine the multipath reception, a direct path reception at the radar device.

AN: The method of any of paragraphs AH-AM, further comprising: controlling, based at least in part on the radar data, an operation of the vehicle within the environment.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:
1. A system comprising:
one or more processors; and
one or more computer-readable media storing computer-executable instructions that, when executed, cause the one or more processors to perform operations comprising:
receiving, from a radar device, radar data associated with a vehicle operating in an environment;
determining, based at least in part on a physical antenna configuration of the radar device, a first virtual array;
processing the radar data using the first virtual array, into first processed radar data;
determining, based at least in part on the first processed radar data, a first attribute associated with at least one of the radar data or the vehicle;

determining, based at least in part on the first attribute, that the first processed radar data is associated with a multipath signal;

processing, based at least in part on the first attribute being associated with the multipath signal, the radar data using a second virtual array, into second processed radar data;

updating, based at least in part on the first attribute being associated with the multipath signal, map data associated with the environment to include an indication of the multipath signal; and controlling, based at least in part on second processed radar data, an operation of the vehicle within the environment.

2. The system of claim 1, wherein the map data is updated to comprise at least one of:

an angle associated with the multipath signal and a pose of the vehicle or a region in which the vehicle is traversing; or object information associated with an object detected using the radar data, wherein the object information comprises a location of the object and a second indication that the object is a radar reflector.

3. The system of claim 1, wherein the first attribute comprises at least one of:

a noise level associated with the radar data;
a pose of the vehicle within the environment;
a region of the vehicle traversing within the environment; or
a position of the vehicle relative to an object detected in the radar data.

4. The system of claim 1, wherein determining that the first attribute is associated with the multipath signal is based at least in part on at least one of the map data, a noise level associated with the radar data, or phase information associated with the radar data.

5. The system of claim 1, the operations further comprising:

determining the second virtual array for processing the radar data, wherein the second virtual array is determined is based at least in part on the map data.

6. One or more non-transitory computer-readable media storing instructions executable by a processor, wherein the instructions, when executed, cause the processor to perform operations comprising:

receiving, from a radar device, radar data associated with a vehicle operating in an environment;

determining, based at least in part on a configuration of an antenna of the radar device and the radar data, a multipath reception at the radar device; and updating, based at least in part on the determining the multipath reception, map data associated with the environment indicative of the multipath reception.

7. The one or more non-transitory computer-readable media of claim 6, wherein the map data is updated to comprise at least one of:

an angle associated with the multipath reception and a pose of the vehicle or a region in which the vehicle is traversing; or object information associated with an object detected using the radar data, wherein the object information comprises a location of the object and an indication that the object is a radar reflector.

8. The one or more non-transitory computer-readable media of claim 7, wherein the object information further comprises a type of radar reflector of the object.

9. The one or more non-transitory computer-readable media of claim 8, wherein the type of radar reflector is indicative of a radar radiation reflection pattern for the object.

10. The one or more non-transitory computer-readable media of claim 6, wherein the determining, based at least in part on the configuration of the antenna of the radar device and the radar data, the multipath reception at the radar device includes applying a first virtual radar array to the radar device.

11. The one or more non-transitory computer-readable media of claim 10, the operations further comprising:

determining a second virtual array for processing the radar data, wherein the second virtual array is determined is based at least in part on a first attribute corresponding to processing the radar data via a first virtual array.

12. The one or more non-transitory computer-readable media of claim 6, the operations further comprising:

determining, based at least in part on the radar data used to determine the multipath reception, a direct path reception at the radar device.

13. The one or more non-transitory computer-readable media of claim 6, the operations further comprising:

controlling, based at least in part on the radar data, an operation of the vehicle within the environment.

14. A method comprising:

receiving, from a radar device, radar data associated with a vehicle operating in an environment;

determining, based at least in part on a configuration of an antenna of the radar device and the radar data, a multipath reception at the radar device; and updating, based at least in part on the determining the multipath reception, map data associated with the environment indicative of the multipath reception.

15. The method of claim 14, wherein the map data is updated to comprise at least one of:

an angle associated with the multipath reception and a pose of the vehicle or a region in which the vehicle is traversing; or object information associated with an object detected using the radar data, wherein the object information comprises a location of the object and an indication that the object is a radar reflector.

16. The method of claim 15, wherein the object information further comprises a type of radar reflector of the object.

17. The method of claim 16, wherein the type of radar reflector is indicative of a radar radiation reflection pattern for the object.

18. The method of claim 14, wherein the determining, based at least in part on the configuration of the antenna of the radar device and the radar data, the multipath reception at the radar device includes applying a first virtual radar array to the radar device.

19. The method of claim 14, further comprising:

determining, based at least in part on the radar data used to determine the multipath reception, a direct path reception at the radar device.

20. The method of claim 19, further comprising:

controlling, based at least in part on the radar data, an operation of the vehicle within the environment.

* * * * *